US007636840B2

(12) United States Patent
Tang

(10) Patent No.: US 7,636,840 B2
(45) Date of Patent: Dec. 22, 2009

(54) SECURE COMMUNICATIONS AND CONTROL IN A FUELING ENVIRONMENT

(75) Inventor: Weiming Tang, Round Rock, TX (US)

(73) Assignee: Dresser, Inc., Addison, TX (US)

( * ) Notice: Subject to any disclaimer, the term of this patent is extended or adjusted under 35 U.S.C. 154(b) by 727 days.

(21) Appl. No.: 11/074,468

(22) Filed: Mar. 4, 2005

(65) Prior Publication Data
US 2005/0147250 A1 Jul. 7, 2005

Related U.S. Application Data

(63) Continuation-in-part of application No. 10/192,668, filed on Jul. 10, 2002, now abandoned.

(51) Int. Cl.
H04L 29/06 (2006.01)
H04L 9/32 (2006.01)
H04L 9/00 (2006.01)
H04L 9/08 (2006.01)

(52) U.S. Cl. .................. 713/150; 713/169; 713/170; 713/171; 713/172; 713/173; 713/175; 713/181; 713/182; 713/184; 380/30; 380/44; 380/46; 380/47; 380/259; 380/277; 380/278; 726/2; 726/4; 726/9; 726/10

(58) Field of Classification Search .............. 713/150; 380/277
See application file for complete search history.

(56) References Cited

U.S. PATENT DOCUMENTS

| 4,967,366 A | * | 10/1990 | Kaehler | 700/237 |
|---|---|---|---|---|
| 5,448,638 A | * | 9/1995 | Johnson et al. | 705/72 |
| 5,557,529 A | | 9/1996 | Warn et al. | |
| 5,600,723 A | * | 2/1997 | Woodall et al. | 713/170 |
| 5,602,917 A | | 2/1997 | Mueller | |
| 5,790,410 A | * | 8/1998 | Warn et al. | 700/232 |
| 6,038,322 A | | 3/2000 | Harkins | |

(Continued)

OTHER PUBLICATIONS

Grabbe, J. Orlin, "The DES Algorithm Illustrated," *Laissez Faire City Times*, vol. 2, No. 28, 16 pages <http://www.aci.net/kalliste/des.htm>, visited Feb. 25, 2005.

(Continued)

*Primary Examiner*—Christian LaForgia
*Assistant Examiner*—Jenise E Jackson
(74) *Attorney, Agent, or Firm*—Fish & Richardson P.C.

(57) ABSTRACT

A method and system for secure communication and control in a fueling environment. In one aspect, the fueling environment with secure communication comprises a fuel dispenser and at least one node communicable coupled with the fuel dispenser. The fuel dispenser is operable to generate a first public key and a first private key associated with the fuel dispenser and publish the first public key within the fueling environment. The fuel dispenser is further operable to authenticate a particular one of the nodes using, at least in part, a second public key associated with the particular node and the first public and the first private keys. The fuel dispenser may then dynamically generate a run-time symmetric key using, at least in part, the first private key and the second public key and communicate data associated with the fueling environment to the authenticated node, with the data encrypted using the symmetric key.

28 Claims, 12 Drawing Sheets

U.S. PATENT DOCUMENTS

| | | | |
|---|---|---|---|
| 6,185,307 B1* | 2/2001 | Johnson, Jr. | 380/270 |
| 6,215,878 B1 | 4/2001 | Harkins | |
| 6,549,626 B1 | 4/2003 | Al-Salqan | |
| 6,736,313 B1* | 5/2004 | Dickson | 235/380 |
| 6,795,555 B1 | 9/2004 | Parisien et al. | |
| 6,826,686 B1 | 11/2004 | Peyravian et al. | |
| 2001/0021253 A1 | 9/2001 | Furuya et al. | |
| 2001/0021254 A1 | 9/2001 | Furuya et al. | |
| 2002/0124170 A1* | 9/2002 | Johnson, Jr. | 713/176 |
| 2003/0153278 A1* | 8/2003 | Johnson, Jr. | 455/74 |
| 2004/0146015 A1 | 7/2004 | Cross et al. | |
| 2004/0185842 A1* | 9/2004 | Spaur et al. | 455/420 |
| 2004/0230793 A1 | 11/2004 | Estrada et al. | |
| 2004/0243496 A1 | 12/2004 | Kim et al. | |
| 2005/0033966 A1* | 2/2005 | Johnson, Jr. | 713/176 |

OTHER PUBLICATIONS

Atreya, Mohan, "*Introduction to Cryptography*," pp. 1-7 <http://www.rsasecurity.com/products/bsafe/overview/IntroToCrypto.pdf>, visited Feb. 25, 2005.

\* cited by examiner

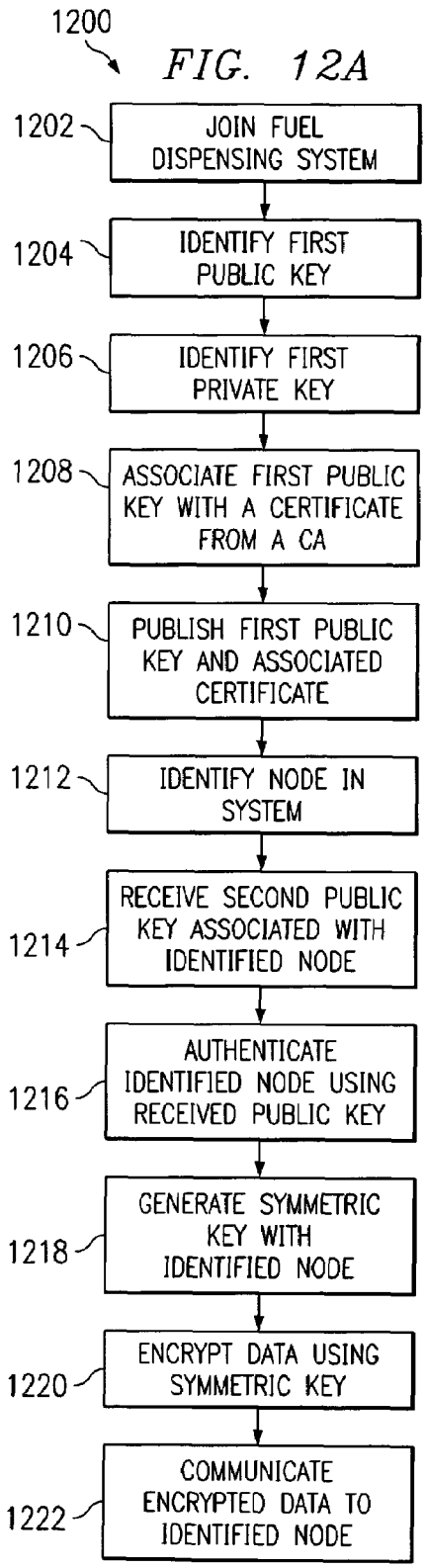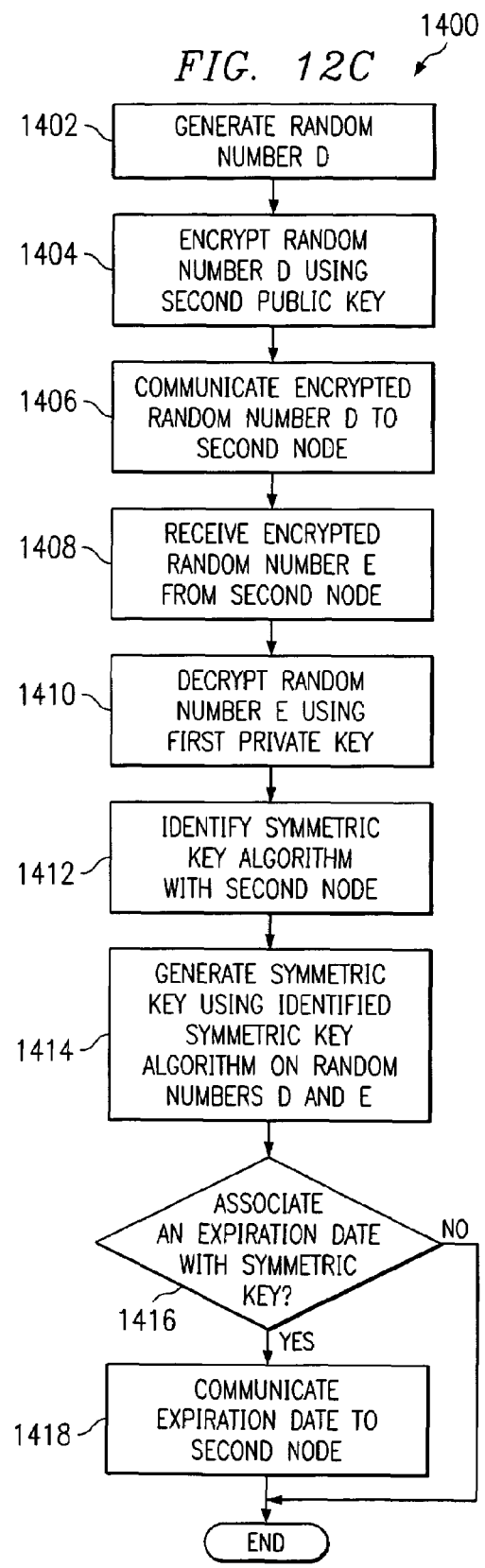

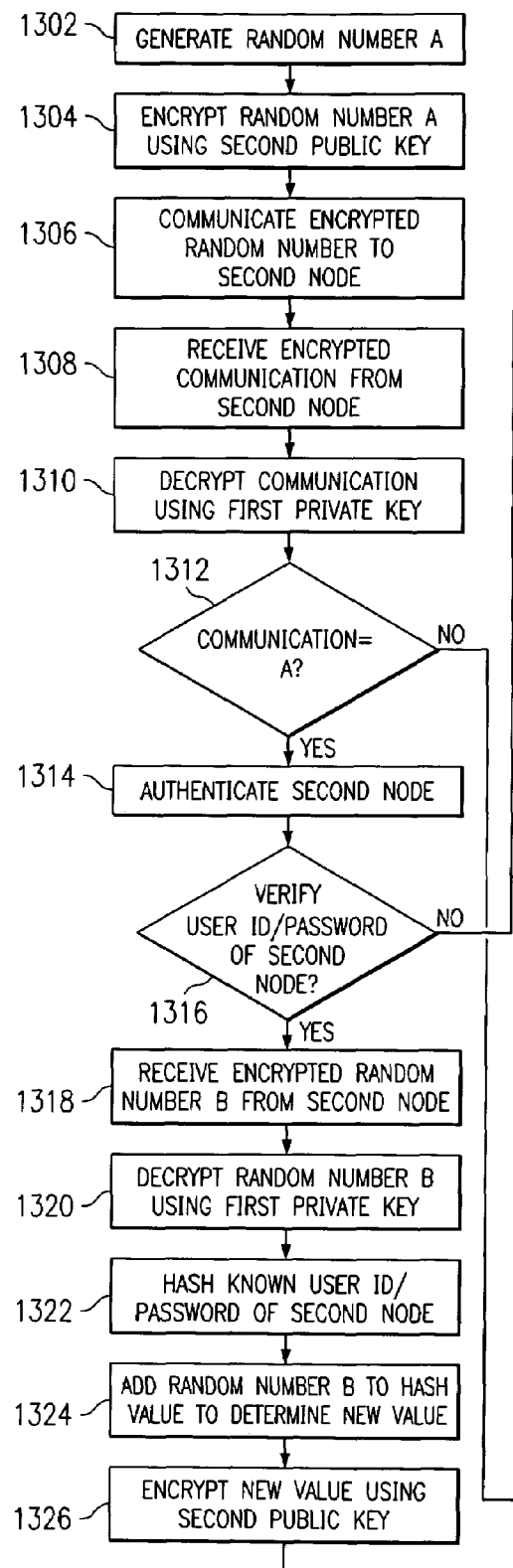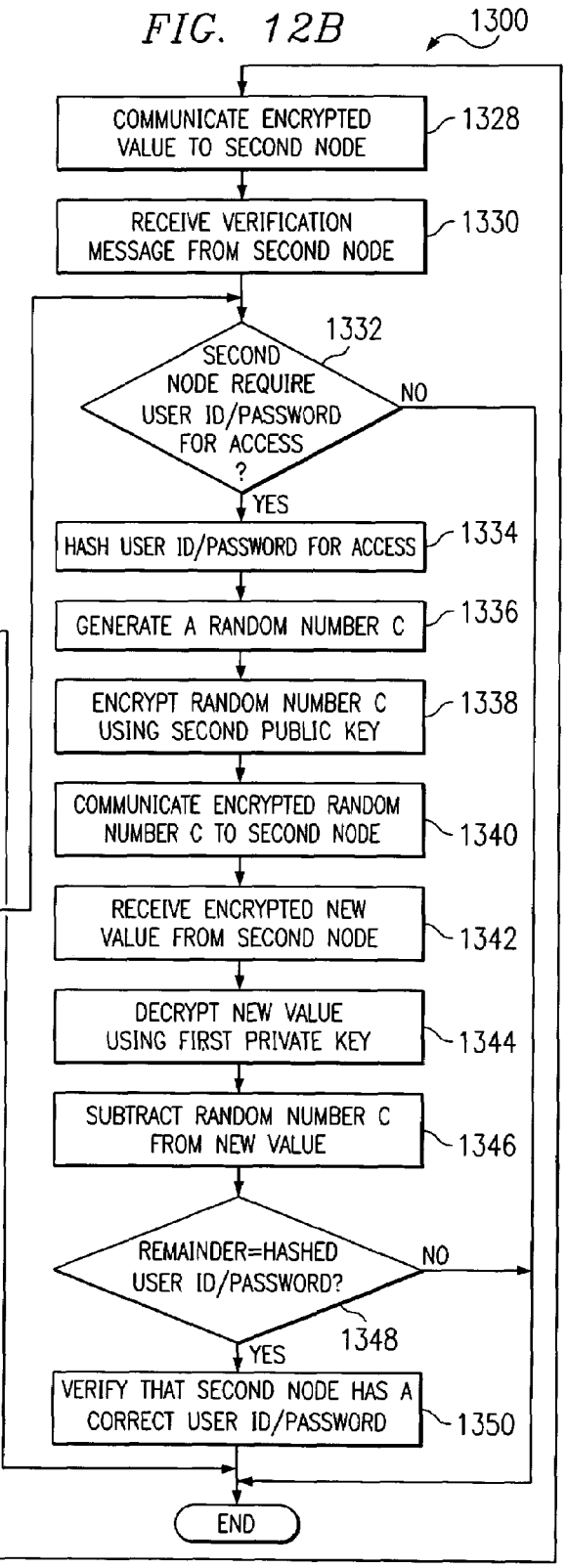
FIG. 12B

SECURE COMMUNICATIONS AND CONTROL IN A FUELING ENVIRONMENT

RELATED APPLICATION

This application is a continuation-in-part of and claims priority from U.S. application Ser. No. 10/192,668, filed Jul. 10, 2002, now abandoned the disclosure of which is incorporated by reference herein.

TECHNICAL FIELD

The present invention relates to a system and method for secure communications in a fueling environment and, more particularly, to the use of symmetric key encryption to encrypt communication and control messages transmitted between systems or nodes within a fueling environment.

BACKGROUND

In recent years traditional service stations have evolved into elaborate point-of-sale (POS) facilities providing a wide variety of customer services, such as fuel dispensing, car washing, ATM access, money order access, and credit card or debit card transactions at the fueling environment. In a traditional fueling environment, card data supplied from a user purchasing fuel or other products and services is transmitted in an unprotected form from the dispenser at the forecourt to the point-of-sale (POS) system, and from the POS system to a network host which performs authentication of the card data. This allows unauthorized parties to easily intercept user card data by tampering with the transmission line, especially if the transmission line is Ethernet or a satellite link.

Although systems exist to secure a special tag or debit pin number using special key management in the dispenser, these systems require special hardware to prevent key tampering at the dispenser through the use of local key management. The special hardware is very costly and difficult to maintain. For example, in order to support a debit card, the dispenser needs to have a special secured pin pad, such as a Tamper Resist Security Module (TRSM) that requires special procedures to install and configure. In addition, these systems require special procedures to dispose of the pin pad when it needs to be replaced because once the key is disclosed, the pin number is no longer secured.

In recent years, it has become desirable in the fueling environment to offer advertisements and additional sales to customers from third party vendors. However, traditionally there has not been a method available to secure user card data information at the dispenser from the third party system.

In current fueling environments, there does not exist a way to secure communication control messages between systems or nodes in the fueling environment. In current fueling environments, a proprietary protocol is used to communicate among systems. If the protocol is obtained by an unauthorized user, the unauthorized user can take over control of the dispenser system. This can lead to potential fraud, such as the obtaining of fuel without payment or the theft of customer card data. The introduction of third party services within the fueling environment introduces an additional potential for unauthorized control of the dispenser system or POS system.

SUMMARY

The present disclosure describes a method and system for secure intranodal communication within a fueling environment. In one aspect, the fueling environment with secure communication comprises a fuel dispenser and at least one node communicable coupled with the fuel dispenser. The fuel dispenser is operable to generate a first public key and a first private key associated with the fuel dispenser and publish the first public key within the fueling environment. The fuel dispenser is further operable to authenticate a particular one of the nodes using, at least in part, a second public key associated with the particular node and the first public and the first private keys. The fuel dispenser may then dynamically generate a run-time symmetric key using, at least in part, the first private key and the second public key and communicate data associated with the fueling environment to the authenticated node, with the data encrypted using the symmetric key.

In certain embodiments, the fuel dispenser authenticates the particular node within the fueling environment by first generating first pseudo-random data. The fuel dispenser may then encrypt the first pseudo-random data using the second public key and communicate the encrypted first pseudo-random data to the node. The fuel dispenser is operable to receive an encrypted second pseudo-random data, with the second pseudo-random data encrypted using the first public key and decrypt the encrypted second pseudo-random data using the first private key. The fuel dispenser may then authenticate the node by comparing the first pseudo-random data and the second pseudo-random data.

In yet another aspect of the present disclosure, the fuel dispenser dynamically generates the run-time symmetric key using, at least in part, the first private key and the second public key by first identifying a symmetric key algorithm. The fuel dispenser is then operable to generate first pseudo-random data and encrypt the first pseudo-random data using the second public key. The fuel dispenser then communicates the encrypted first pseudo-random data to the particular node. Next, the fuel dispenser receives an encrypted second pseudo-random data, the second pseudo-random data encrypted using the first public key and decrypts the encrypted second pseudo-random data using the first private key. The fuel dispenser is ten operable to generate a symmetric key using the identified symmetric key algorithm on the first pseudo-random data and the second pseudo-random data. This allows the communication of secure data associated with the fueling environment from the fuel dispenser to the authenticated node by transmitting at least one encrypted communication between the fuel dispenser and the node, with the communication encrypted using the symmetric key.

DESCRIPTION OF THE DRAWINGS

FIGS. 12A-C illustrate example methods for communicating within a secure fuel dispensing environment in accordance with certain embodiments of the present disclosure.

DETAILED DESCRIPTION

The present disclosure generally describes the use of public key/private key encryption in a fueling environment. Public key/private key encryption provides for the capability of encrypting a message using a public key which can only be decrypted by someone possessing a private key associated with the pubic key. A popular public key/private key encryption algorithm is the RSA public-key cryptography system developed by Ronald L. Rivest, Adi Shamir, and Leonard M. Adleman in 1977. The challenge of public-key cryptography is developing a system in which it is extremely difficult to determine the private key. This is accomplished through the use of a one-way function. Using a one-way function it is relatively easy to compute a result given some initial input values. However, it is extremely difficult to determine the original values starting with the result. In mathematical terms, given a value x, computing f(x) is relatively easy. However, given the result f(x), computing x is very difficult. The one-way function used in the RSA algorithm is a multiplication of prime numbers. It is mathematically simple to multiply two large prime numbers, however it is extremely time-consuming to factor them for most very large primes. Public-key cryptography makes use of this property of large prime numbers by implementing a system that uses two large primes to build a private key, and the product of the primes to build a public key. A simplified example of the RSA algorithm is described as follows:

Key Generation

By selecting two primes, P=11 and Q=23, the RSA algorithm is used to generate the numbers N, E, and D in the following manner:

$$N = P \times Q = 11 \times 23 = 253$$

$$PHI = (P-1)(Q-1) = 220$$

The public exponent E is calculated so that the greater common divisor of E and PHI is 1. In other words, E is relatively prime with PHI. For this example:

$$E = 3$$

In the RSA algorithm, N and E are used as the public keys. The private key D is the inverse of E modulo PHI. By using an extended Euclidian algorithm, the example private key is determined as D=147.

Encryption

To encrypt data, for example a number M=4, the following procedure is used to form an encrypted message C:

$$C = M^E \bmod N = 4^3 \bmod 253 = 64$$

Thus, the example encrypted message is 64.

Decryption

The encrypted message will be decrypted to form a decrypted message M from the encrypted message C using the following procedure:

$$M = C^D \bmod N = 64^{147} \bmod 253 = 4$$

thereby recovering the original message data. Although the above example used small prime numbers for illustrative purposes, in actual practice the prime numbers selected for public key/private key cryptography are very large numbers, for example 128-bit or 256-bit prime numbers.

Figure 1:
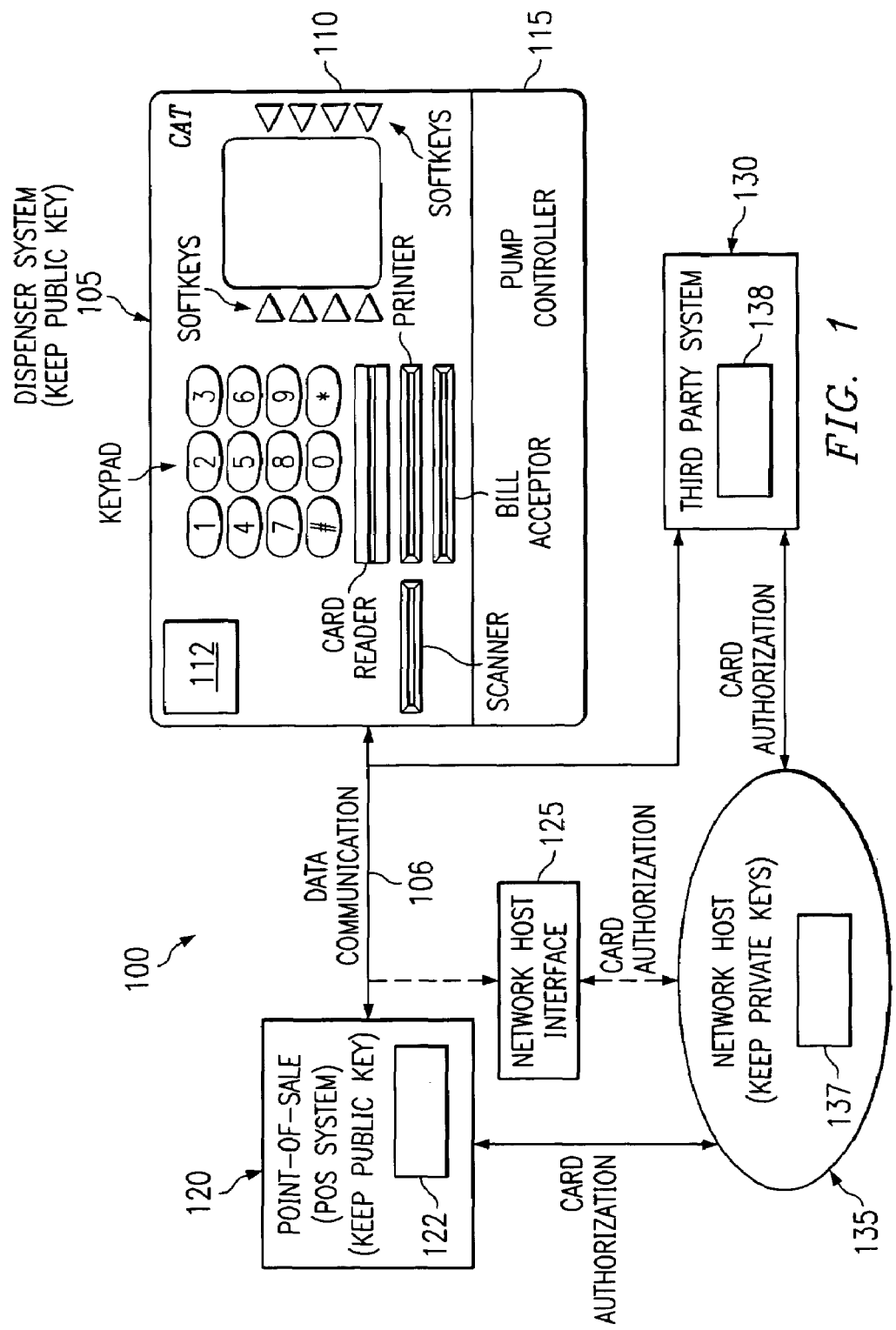
FIG. 1 illustrates a block diagram of a secured user data communication system 100 for use in a fueling environment in accordance with one embodiment of the present invention.

Referring to FIG. 1, a block diagram of a secured user data communication system 100 for use in a fueling environment in accordance with one embodiment of the present invention is illustrated. The communication system 100 includes a dispenser system 105 connected, using a data communication line 106, to a point-of-sale (POS) system 120, a network host interface 125, if necessary, and a third party system 130. A network host 135, preferably a remote network host, is in communication with the POS system 120, the network host interface 125, and the third party system 130 using a communication network, such as an Ethernet, satellite network, optical fiber network, telephone network, a serial link, a controller area network (CAN), etc. The network host 135 is used to authorize customer transactions conducted at the dispenser system 105 or POS system 120 in the fueling environment. The network host interface 125 is used, if necessary, to interface the fueling environment with the network host 135.

The dispenser system 105 includes a customer access terminal (CAT) 110 which is used to connect with various customer access interfaces such as a keypad, card reader, scanner, bill acceptor, printer, display screen, soft keys, etc., and a pump controller 115 which is used to control the hydraulics of the dispenser system 105 to dispense fuel to customers.

The POS system 120 is typically located inside the fueling environment store and functions as a dispenser control system to authorize customer transactions, such as fueling at the dispenser system 105, use of a car wash, or merchant transactions within the store. In accordance with the current embodiment of the invention, the CAT 110 and POS system 120 both maintain at least one public key to be used for the encryption of transmitted data, such as user credit card data, to be sent to the network host 135 for authorization of the current customer transaction. The network host 135 uses at least one private key maintained at the network host 135 to decrypt the received data and send an authorization message to the CAT 110 or POS system 120 if the customer transaction is authorized.

The dispenser system 105 and POS system 120 can each include a corresponding dispenser control library 112, 122 including software instructions for maintaining the public keys and performing the procedures of the present invention. Additionally, the network host 135 can include a dispenser control library 137 including software instructions for maintaining the private keys and performing the procedures or techniques described in the present disclosure. Through the installation of dispenser control libraries into the various systems and components of the fueling environment, the present invention can be implemented in a manner that is transparent to existing fueling systems. As a result, the dispenser control library not only enhances the security of existing systems, but also reduces the cost of updating to new systems.

An authenticated third party system 130 can be plugged into the data communication line between the dispenser system 105 and the POS system 120 to deliver additional services, such as advertising content or sale offers for additional merchandise, to a customer during a fueling session. In order to authorize an additional sale, the third party system 130 receives encrypted card data from the dispenser system 105 and provides it to the network host 135 for authorization. The third party system 130 can optionally include a software library 138 that contains software instructions and data for interacting with the dispenser system 105 and POS system 120, without the necessity to contain public key/private key encryption information. Although the third party system 130 is illustrated in FIG. 1 as using the same network host 135 for transaction authorization as the POS system 120, it should be understood that the third party system 130 and POS system 120 can each be connected to separate network hosts that perform authorization procedures independently from one another.

The use of a public key for encryption of user card data in the fueling environment and a private key for validation of the encrypted user card data in a network host 135 provides for a number of advantages over traditional methods. Through the use of a public/private key algorithm, the dispenser system 105 or POS system 120 at the fueling environment receives user card data, encrypts the user card data using the public key, and sends the encrypted data to the network host 135. The encrypted user card data can only be decrypted using a private key maintained at the network host 135. Thus, the card data is resistant to interception by undesirable parties even if the data communication line between components in the fueling environment, or the network between the fueling environment and the network host 135 is tampered with or compromised. The public key stored in the fueling environment does not have to be protected since the encrypted information cannot be decrypted without obtaining the private key stored in the network host 135. An additional advantage of the current embodiment of the present invention is that user card data can be secured from the third party system 130, as the third party system 130 does not need to maintain any private keys in order for a transaction to be authorized by the network host 135.

The public/private key encryption of the present invention can also be applied to pin number encryption, such as that used with a debit card pin number. The installation of a special secured pin pad in the dispenser, such as a Tamper Resist Security Module (TRSM) and local key management is no longer necessary, thus eliminating the special procedures required for installation, maintenance, and disposal. If a bank desires to implement the public-key/private-key solution of the present invention, the bank can issue a public key to each pin pad module in the fueling environment. The pin pad module can store the public key and encrypt the pin number using the public key. The pin pad can then send the encrypted pin number through the CAT system and/or POS system to the remote network host associated with the bank. The remote network host can then decrypt the number with its own private key. Thus, only the bank that issues the public key is able to decrypt the encrypted data even if the public key is acquired by an unauthorized party.

In an alternate embodiment of the communication system of FIG. 1, the public/private keys used for encryption can be updated periodically to provide for greater security. For example, an initial private key can be stored at the network host 135 and a corresponding initial public key stored at the CAT 110. Once communication between the network host 135 and the CAT 110 is established, the network host 135 periodically generates or selects a new private key/public key pair. The new public key corresponding to the new private key is encrypted by the network host 135 using the old private key and transmitted as an encrypted message to the CAT 110. The CAT 135 then decrypts the encrypted message using the old public key to obtain the new public key and sends an acknowledgment to the network host 135. Further communication between the network host 135 and the CAT 110 is performed using the new public key/private key pair until a new pair is selected by the network host 135. In a similar manner, the network host 135 can update the private key/public key pair used for communication between the network host 135 and the CAT 110. Periodically updating the private key/public key pair provides for protection against tampering because even if the current private key has been compromised it will be soon be changed.

Figure 2:
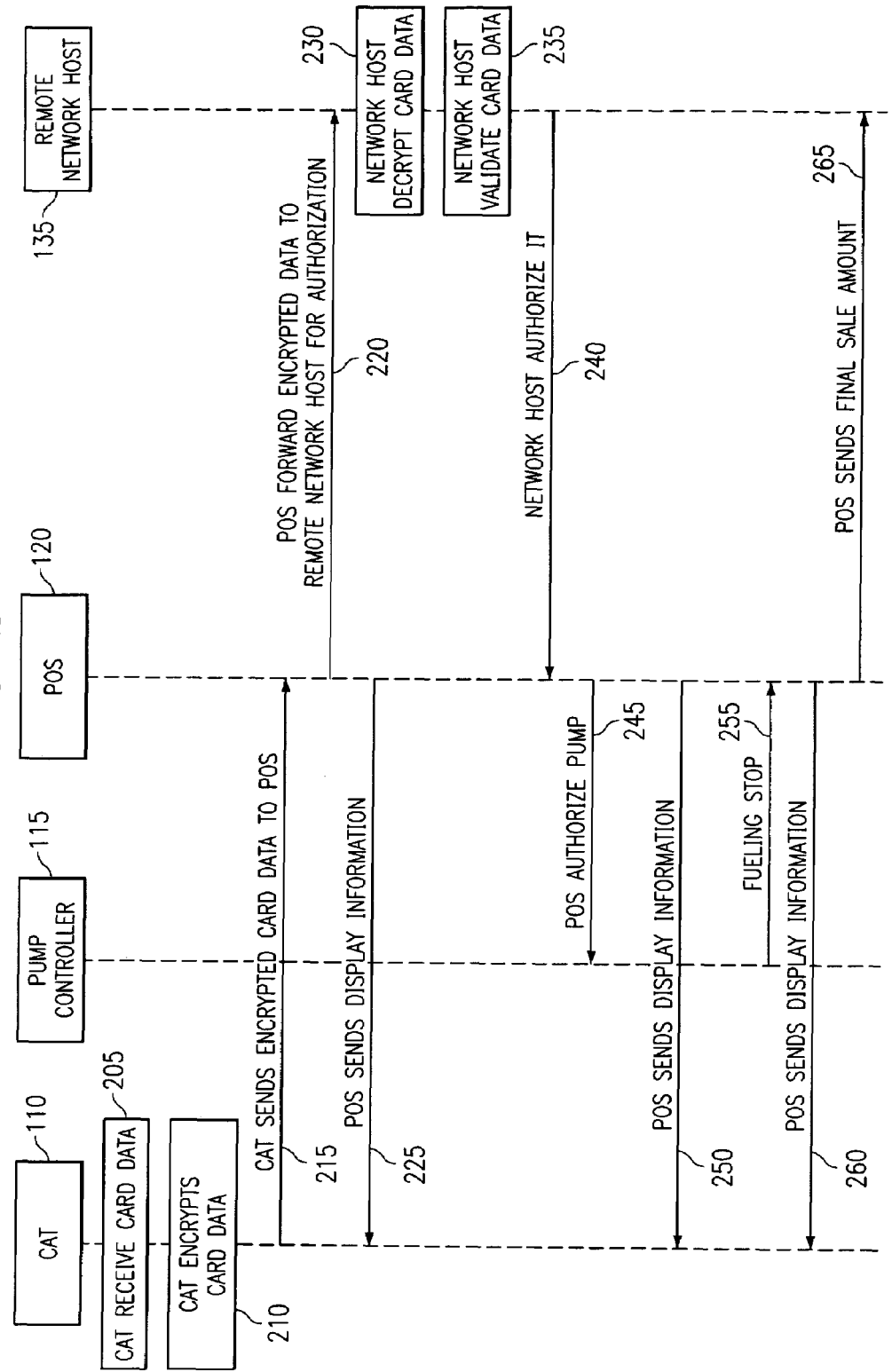
FIG. 2 illustrates a method for providing a secured credit card fueling transaction in accordance with the secured user data communication system 100 of FIG. 1.

Referring now to FIG. 2, there is illustrated a method for providing a secured credit card fueling transaction in accordance with the secured user data communication system 100 of FIG. 1. In step 205, the CAT 110 receives credit card data from a customer initiating a fueling transaction at the dispenser system 105, i.e. a pay-outside credit card transaction. In step 210, the CAT 110 encrypts the card data using a public key and sends the encrypted card data to the POS system 120 (step 215). In step 220, the POS system 120 forwards the encrypted card data to a remote network host 135 for authorization. In step 225, the POS system 120 sends display information to the CAT 110 to provide the customer with a message indicating that authorization is in progress. In step 230, the remote network host 135 uses a private key to decrypt the received encrypted card data. The remote network host 135 validates the decrypted card data (step 235), and sends an authorization message to the POS system 120 if the card data has been authorized (step 240).

Upon receiving authorization from the remote network host 135, the POS system 120 sends a pump authorization message to pump controller 115 (step 245) and sends display information to the CAT 110 to indicate to the customer that fueling can begin (Step 250). After completion of fueling by the customer, the pump controller 115 sends a fueling stop message to the POS system 120 (step 255). The POS system 120 sends display information to the CAT 110 indicating the final sale amount to the customer (step 260). The POS system 120 also sends a message to the remote network host 135 indicating the final amount of the sale (step 265).

Figure 3:
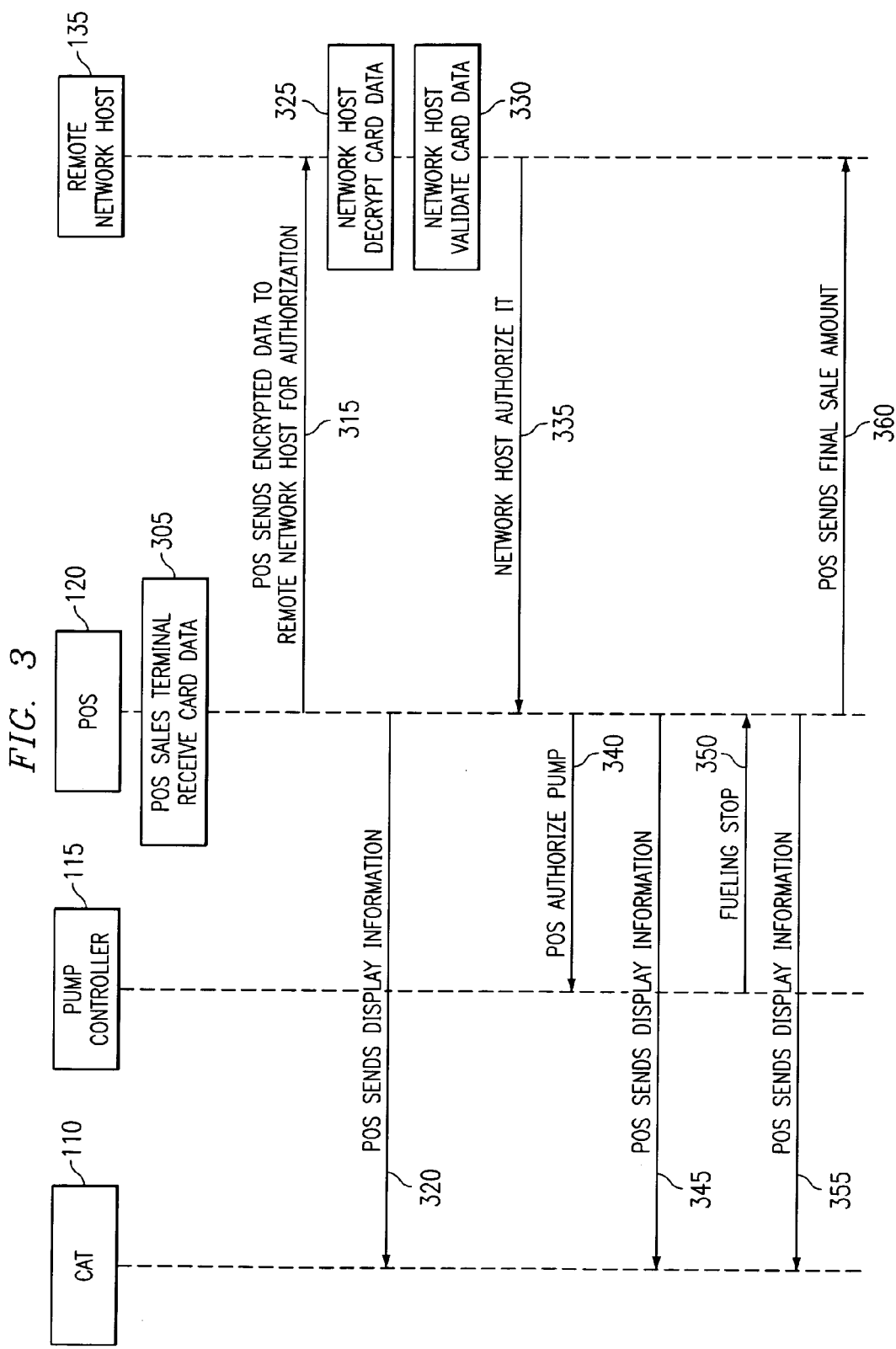
FIG. 3 illustrates another method for providing a secured credit card fueling transaction in accordance with the secured user data communication system 100 of FIG. 1.

Referring now to FIG. 3, there is illustrated another method for providing a secured credit card fueling transaction in accordance with the secured user data communication system 100 of FIG. 1. In step 305, the POS system 120 receives credit card data from a customer initiating a fueling transaction using a sales terminal at the POS system 120, i.e. a pay-inside credit card transaction. In step 310, the POS system 120 encrypts the card data using a public key and sends the encrypted card data to the remote network host 135 for authorization (step 315). In step 320, the POS system 120 sends display information to the CAT 110 to provide the customer with a message indicating that authorization is in progress. In step 325, the remote network host 135 uses a private key to decrypt the encrypted card data. The remote network host 135 validates the card data (step 330) and sends an authorization message to the POS system 120 if the card data has been authorized (step 335).

Upon receiving authorization from the remote network host 135, the POS system 120 sends a pump authorization message to pump controller 115 (step 340) and sends display information to the CAT 110 indicating to the customer that fueling can begin (step 345). After completion of fueling by the customer, the pump controller 115 sends a fueling stop message to the POS system 120 (step 350). The POS system 120 sends display information to the CAT 110 indicating the final sale amount to the customer (step 355). The POS system 120 also sends a message to the remote network host 135 indicating the final amount of the sale (step 360).

Figure 4:
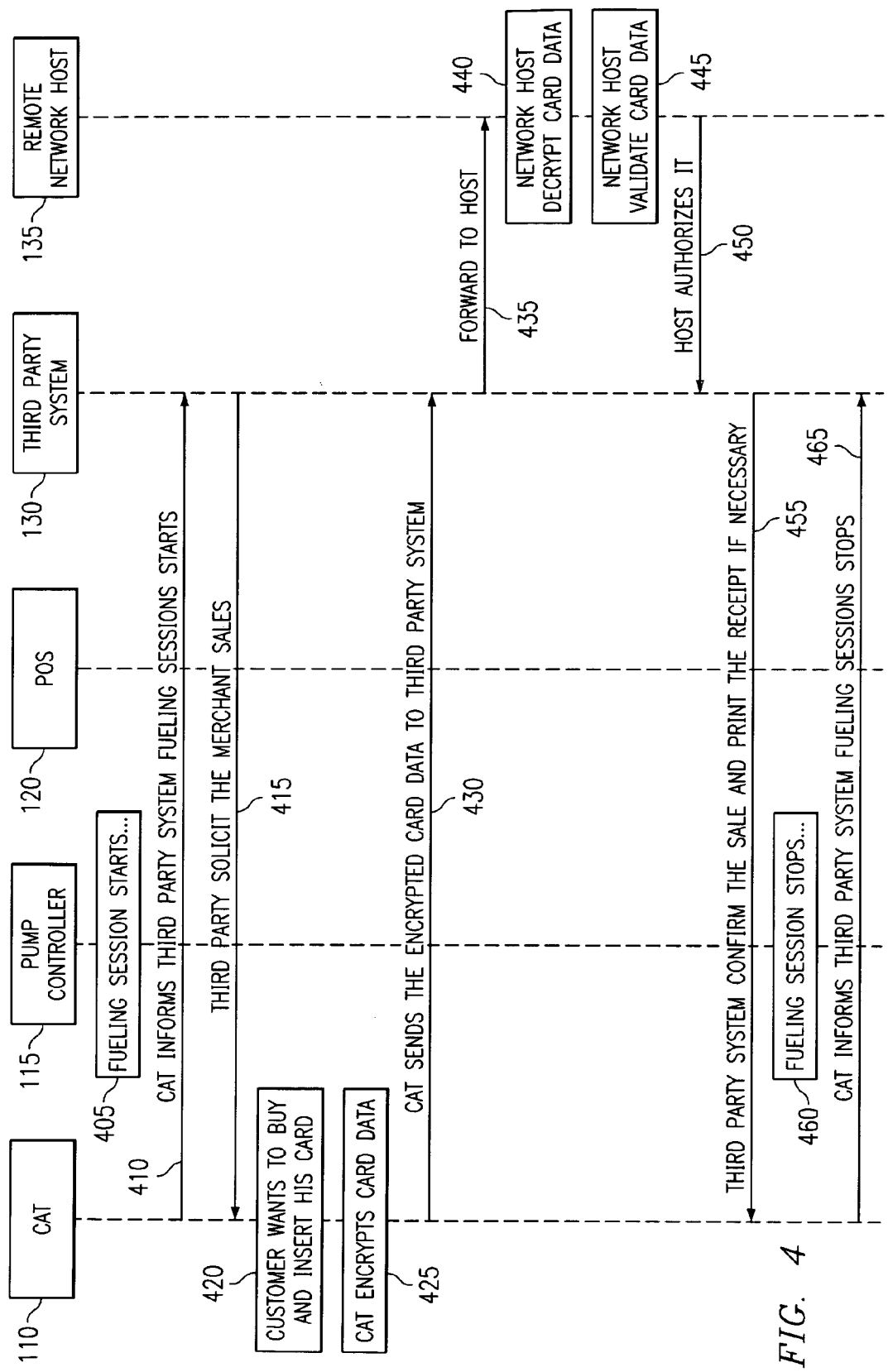
FIG. 4 illustrates still another method for providing a secured credit card fueling transaction in accordance with the secured user data communication system 100 of FIG. 1.

Referring now to FIG. 4, there is illustrated still another method for providing a secured credit card fueling transaction in accordance with the secured user data communication system 100 of FIG. 1. In step 405, a customer initiates a fueling transaction at the dispenser system 105. In step 410, the CAT 110 sends a message to the third party system 130 indicating that a fueling session has started. In step 415, the third party system 130 sends a solicitation message to the CAT 110 to display offers for additional purchase to the customer. If the customer wishes to purchase the solicited sale, the customer inserts a credit card into the CAT 110 to provide card data (step 420). In step 425, the CAT 110 encrypts the card data using a public key and sends the encrypted card data to the third party system 130 (step 430). In step 435, the third party system 130 forwards the encrypted card data to the remote network host 135 for authorization. In step 440, the remote network host 135 uses a private key to decrypt the encrypted card data. The remote network host 135 validates the card data (step 445) and sends an authorization message to the third party system 130 if the card data has been authorized (step 450). Upon receiving authorization from the remote network host 135, the third party system 130 sends a message to the CAT 110 to indicate to the customer that the sale has been confirmed and to print a receipt if necessary (step 455). After completion of the fueling session by the customer (step 460), the CAT 110 sends a message to the third party system 130 indicating that the fueling session has stopped (step 465).

Figure 5:
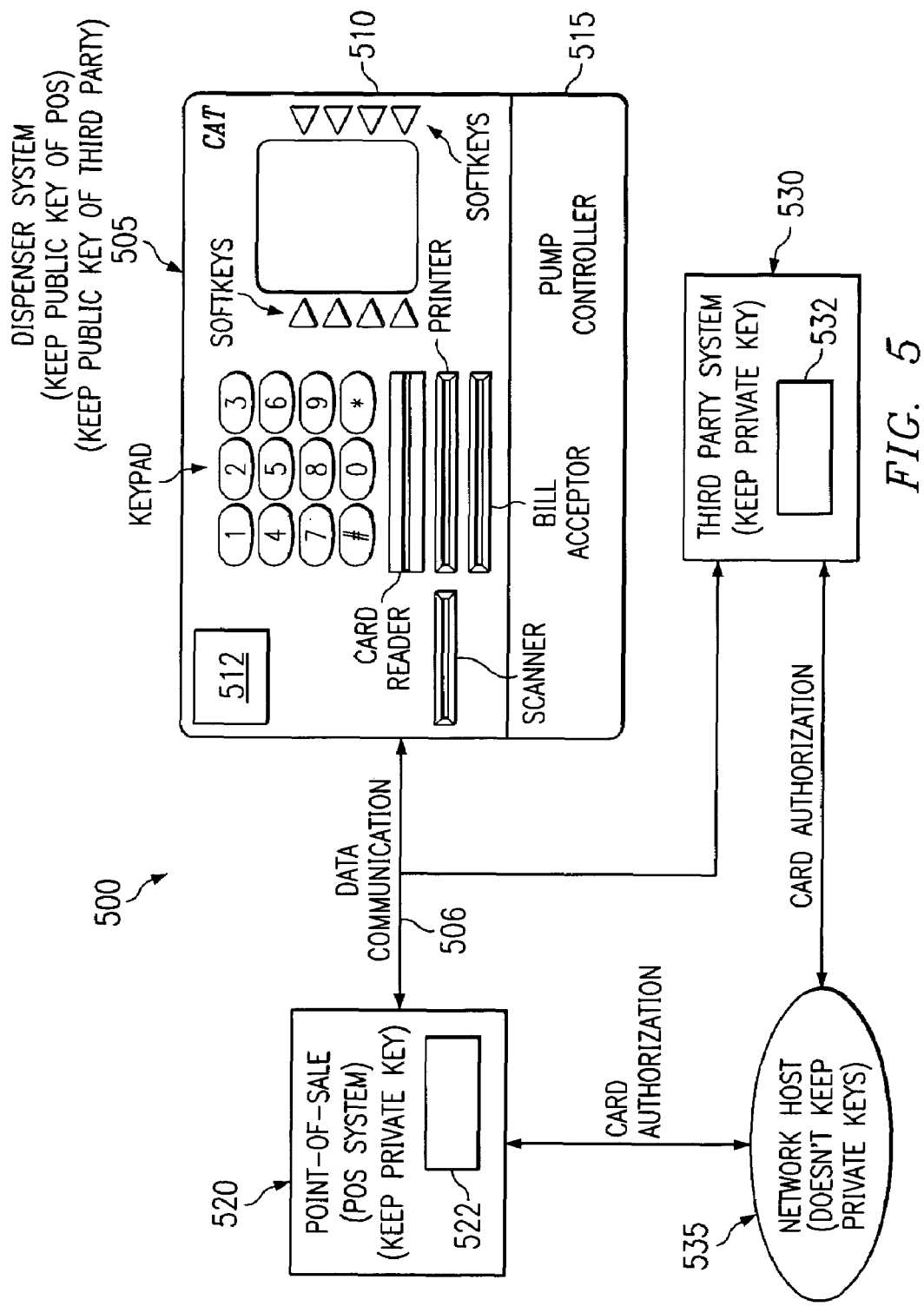
FIG. 5 is a block diagram of a secured user data communication system 500 for use in a fueling environment in accordance with another embodiment of the present invention.

Referring now to FIG. 5, a block diagram of a secured user data communication system 500 for use in a fueling environment in accordance with another embodiment of the present invention is illustrated. The communication system 500 includes a dispenser system 505, including a CAT 510 and pump controller 515, connected, using a communication line 506, to a point-of-sale (POS) system 520 and a third party system 530. A network host 535, preferably a remote network host, is in communication with the POS system 520 and the third party system 530 using a communication network, such as an Ethernet, satellite network, optical fiber network, telephone network, a serial link, a controller area network (CAN), etc. In the embodiment of FIG. 5, the network host 535 performs card authentication but is not required to maintain any private keys.

In the communication system of FIG. 5, the CAT 510 keeps separate public keys associated with the POS system 520 and the third party system 530 for the encryption of user card data, such as credit card data. The POS system 520 and third party system 530 each maintain their own private keys for the decryption of encrypted credit card data received from the CAT 510. The dispenser system 505 can include a dispenser control library 512 including software instructions for maintaining the public keys and performing the procedures of the present invention. Additionally, the POS system 520 and third party system 530 can each include a corresponding dispenser control library (522 and 532, respectively) including software instructions for maintaining the private keys and performing the procedures of the present invention. In addition, the private keys can be stored in tamper resistant hardware.

When the CAT 510 sends credit card data to the POS system 520, the CAT 510 encrypts the card data using the public key associated with the POS system 520. After receiving the encrypted card data, the POS system 520 decrypts the card data using its private key and sends the card data to the remote network host 525 for authentication. Similarly, when the CAT 510 sends credit card data to the third party system 530, the CAT 510 encrypts the card data using the public key associated with the third party system 530. After receiving the encrypted card data, the third party system 530 decrypts the card data using its private key and sends the card data to the remote network host 525 for authentication. Since the POS system 520 and third party system 530 each keep their own unique private key, each cannot decrypt card data that is intended for the other, thus enhancing card data security. Although the third party system 530 is illustrated in FIG. 5 as using the same network host 535 for transaction authorization as the POS system 520, it should be understood that the third party system 530 and POS system 520 can each be connected to separate network hosts that perform authorization procedures independently from one another.

The communication system of FIG. 5 is particularly useful if the remote network host to which the fueling environment is connected does not support the maintaining of private keys. The POS system 520 and the third party system 530 can each maintain their own private keys whose associated public keys can be loaded into the dispenser system 505. In this way, card data being transferred on a local transmission line within the fueling environment can be protected against tampering.

In an alternate embodiment of the communication system of FIG. 5, the public/private keys used for encryption can be updated periodically to provide for greater security. For example, an initial private key can be stored at the POS system 520, and a corresponding initial public key stored at the CAT 510. Once communication between the POS system 520 and the CAT 510 is established, the POS system 520 periodically generates or selects a new private key/public key pair. The new public key corresponding to the new private key is encrypted by the POS system. 520 using the old private key, and transmitted as an encrypted message to the CAT 510. The CAT 510 then decrypts the encrypted message using the old public key to obtain the new public key, and sends an acknowledgment to the POS system 520.

Further communication between the POS system 520 and the CAT 510 is performed using the new public key/private key pair until a new pair is selected by the POS system 520. In a similar manner, the third party system 530 can update the private key/public key pair used for communication between the third party system 530 and the CAT 510. Periodically updating the private key/public key pair provides for protection against tampering because even if the current private key has been compromised it will be soon be changed.

Figure 6:
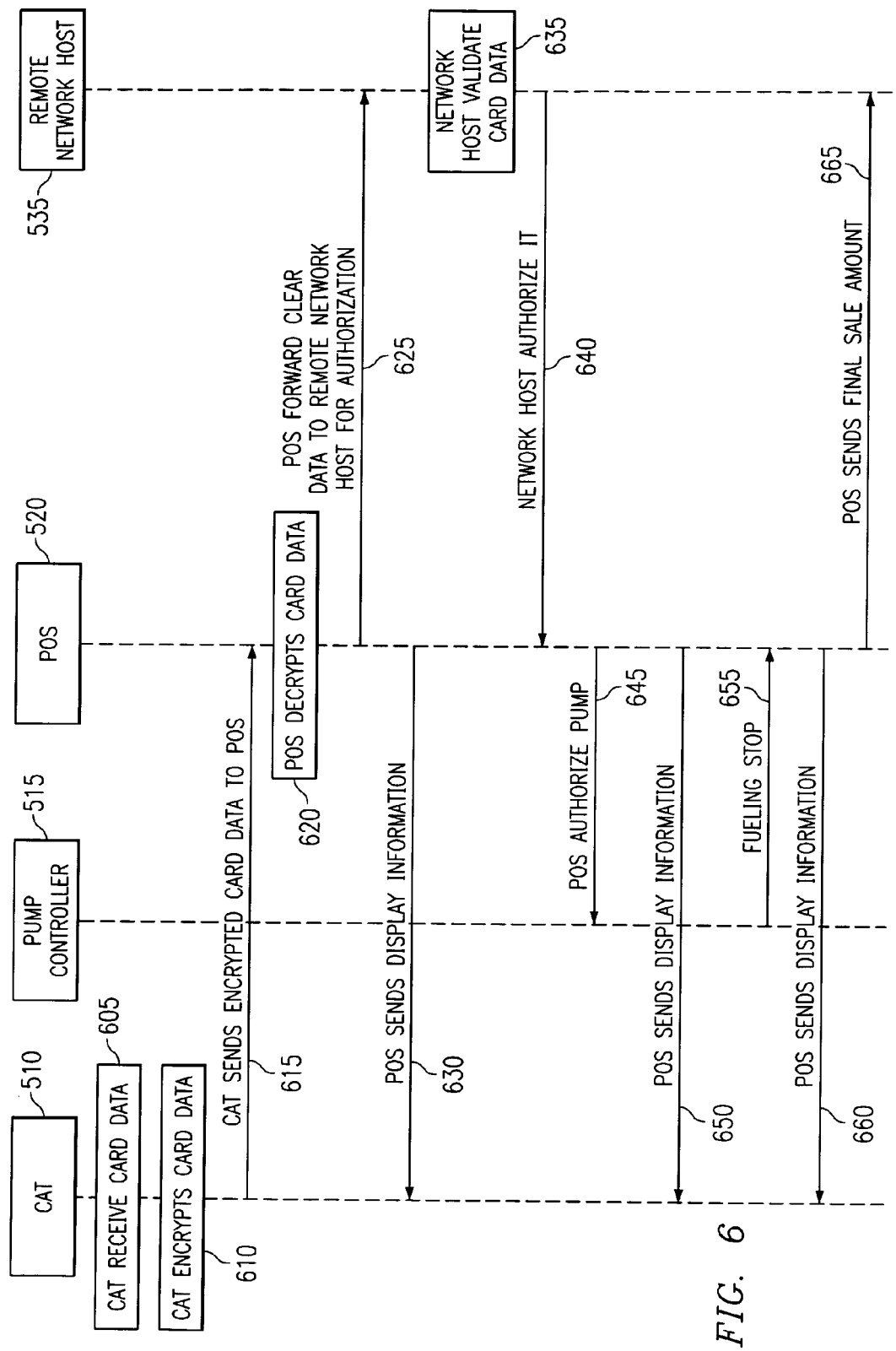
FIG. 6 illustrates a method for providing a secured credit card fueling transaction in accordance with the secured user data communication system 500 of FIG. 5.

Referring now to FIG. 6 there is illustrated a method for providing a secured credit card fueling transaction in accordance with the secured user data communication system 500 of FIG. 5. In step 605, the CAT 510 receives credit card data from a customer initiating a fueling transaction at the dispenser system 505. In step 610, the CAT 510 encrypts the card data using a public key associated with the POS system 520, and sends the encrypted card data to the POS system 520 (step 615). In step 620, the POS system 520 decrypts the card data using its private key and forwards the encrypted card data to a remote network host 535 for authorization (step 625). In step 630, the POS system 520 sends display information to the CAT 510 to provide the customer with a message indicating that authorization is in progress. The remote network host 135 validates the card data (step 635), and sends an authorization message to the POS system 520 if the card data has been authorized (step 640).

Upon receiving authorization from the remote network host 535, the POS system 520 sends a pump authorization message to pump controller 515 (step 645), and sends display information to the CAT 510 indicating to the customer that fueling can begin (Step 650). After completion of fueling by the customer, the pump controller 515 sends a fueling stop message to the POS system 520 (step 655). The POS system 520 sends display information to the CAT 510 indicating the final sale amount to the customer (step 660). In addition, the POS system 520 sends a message to the remote network host 535 indicating the final amount of the sale (step 665).

Figure 7:
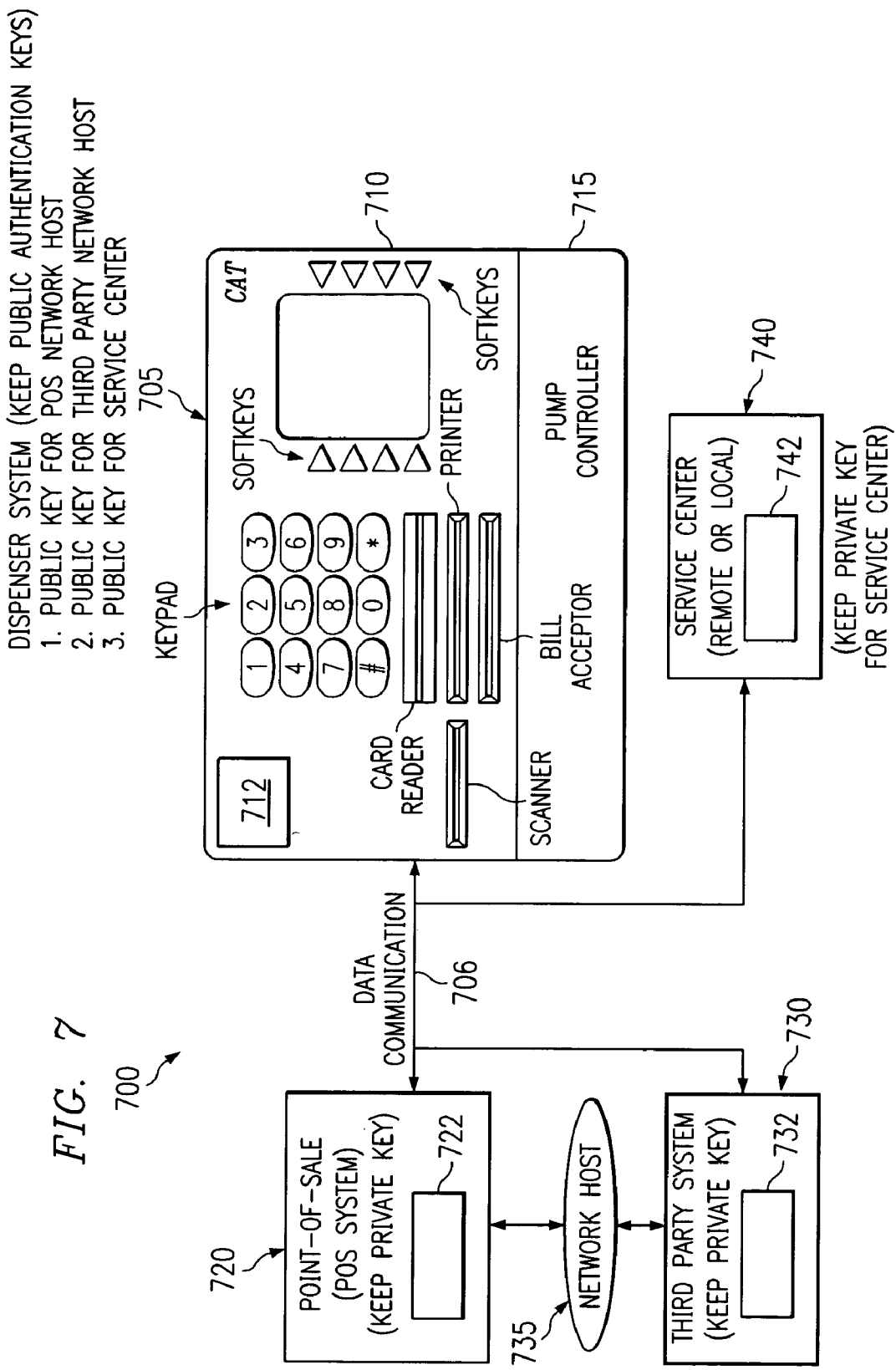
FIG. 7 is a block diagram of a secured data communication system 700 for use in a fueling environment in accordance with another embodiment of the present invention.

Referring now to FIG. 7, a block diagram of a secured data communication system 700 for use in a fueling environment in accordance with another embodiment of the present invention is illustrated. In accordance with the current embodiment, a dispenser control protocol is secured using public-key/private key encryption to ensure that a dispenser system can only accept commands from trusted sources. The communication system 700 includes a dispenser system 705, including a CAT 710 and pump controller 515, connected, using a data communication line 706, to a point-of-sale (POS) system 720, a third party system 730, and a service center 740. The service center 740 can be a remote or local service center for sending service request commands to the dispenser system 705. The POS system 720 and third party system 730 are in communication with a remote network host 735 using a communication network, such as an Ethernet or satellite network, to provide authorization for customer credit card transactions.

In accordance with the current embodiment of the invention, the dispenser system 705 maintains separate public authentication keys associated with each of the POS system 720, the third party system 730, and the service center 740. The POS system 720, the third party system 730, and the service center 740 each maintain a separate private key associated with the respective keys maintained by the dispenser system 705. By using public key/private key encryption, POS commands cannot be sent without the POS system's 720 private key, even if the protocol is known to the sender. Similarly the third party system 730 and service center 740 can only send commands to the dispenser system 705. Although the third party system 730 is illustrated in FIG. 7 as using the same network host 735 for transaction authorization as the POS system 720, it should be understood that the third party system 730 and POS system 720 can each be connected to separate network hosts that perform authorization procedures independently from one another.

The dispenser system 705 can include a dispenser control library 712 including software instructions for maintaining the public keys and performing the procedures of the present invention. Additionally, the POS system 720, the third party system 730, and the service center 740 can each include a corresponding dispenser control library 722, 732, and 742 including software instructions for maintaining the private keys and performing the procedures of the present invention. In addition, the private keys can be stored in tamper resistant hardware.

In an alternate embodiment of the communication system of FIG. 7, the public/private keys used for encryption can be updated periodically to provide for greater security. For example, an initial private key can be stored at the POS system 720, and a corresponding initial public key stored at the dispenser system 705. Once communication between the POS system 720 and the dispenser system 705 is established, the POS system 720 periodically generates or selects a new private key/public key pair. The new public key corresponding to the new private key is encrypted by the POS system 720 using the old private key, and transmitted as an encrypted message to the dispenser system 705. The dispenser system 705 then decrypts the encrypted message using the old public key to obtain the new public key, and sends an acknowledgment to the POS system 720.

Further communication between the POS system 720 and the dispenser system 705 is performed using the new public key/private key pair until a new pair is selected by the POS system 720. In a similar manner, the third party system 730 can update the private key/public key pair used for communication between the third party system 730 and the dispenser system 705. Similarly, the service center 740 can update the public key/public key pair used for communication between the service center 740 and the dispenser system 705. Periodically updating the private key/public key pair provides for protection against is tampering because even if the current private key has been compromised it will be soon be changed.

Figure 8:
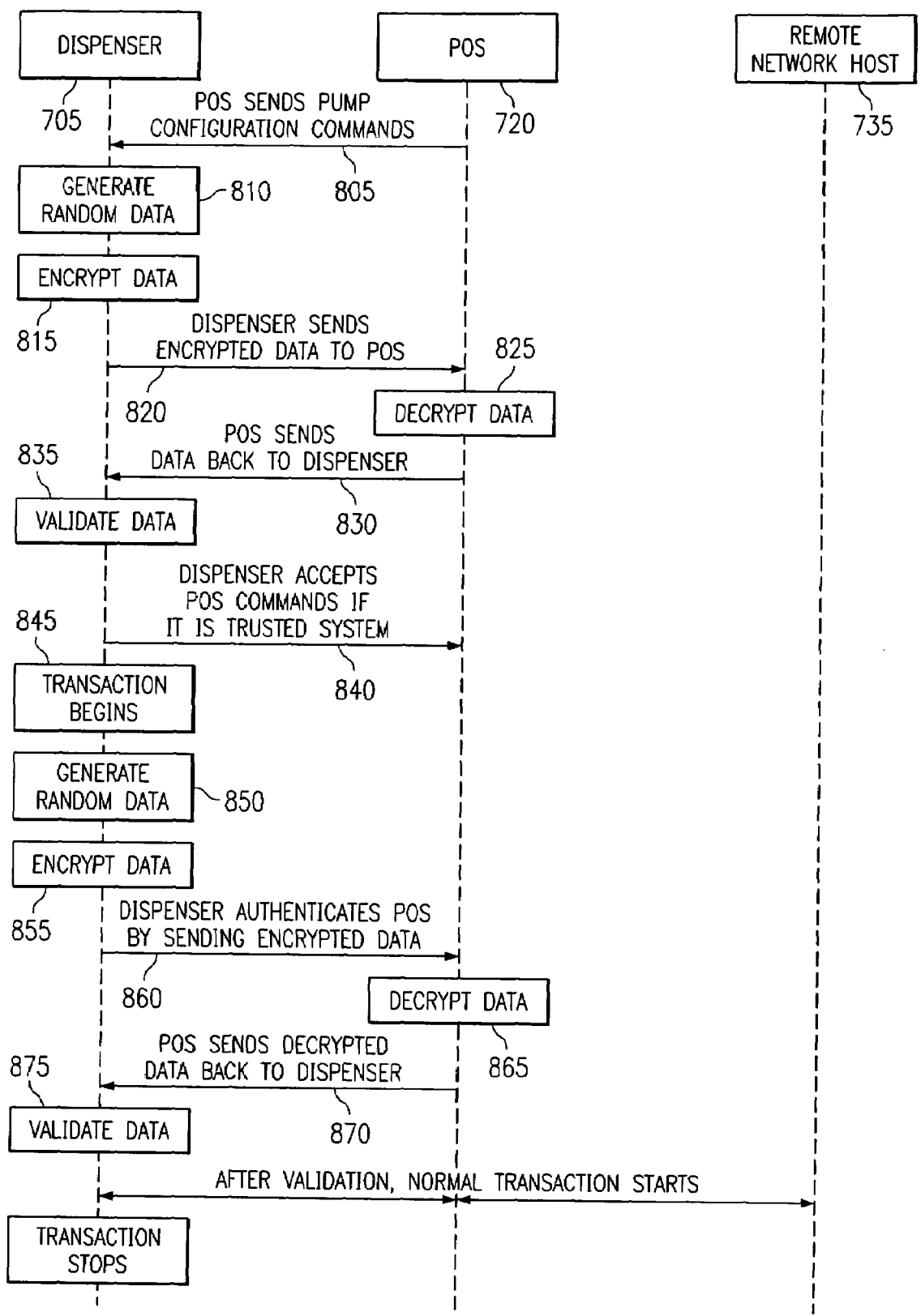
FIG. 8 illustrates a method for providing a secured fueling transaction in accordance with the secured data communication system 700 of FIG. 7.

Referring now to FIG. 8, there is illustrated a method for providing a secured fueling transaction in accordance with the secured data communication system 700 of FIG. 7. In step 805, the POS system 720 sends pump configuration commands to the dispenser system 705. After receiving the pump configuration commands from the POS system 720, the dispenser system 705 generates random or pseudo-random data based upon the current time, time related data, or other unique data that cannot be predicated (step 810). The dispenser system 705 encrypts the generated data using the public key associated with the POS system 720 (step 815) and sends the encrypted data to the POS system 720 for authentication (step 820). In step 825, the POS system 720 decrypts the received encrypted data using its private key, and sends the decrypted data back to the dispenser system 705 (step 830). The dispenser system validates the received data by comparing it with its original generated data (step 835). If the received data is validated, the dispenser system 705 sends a message to the POS system 720 indicating that it is a trusted system, and that the dispenser system 705 will accept and process POS commands from the POS system 720 (step 840).

In addition, the same authentication procedure can be performed before each customer transaction starts. For example, after a customer begins a transaction at the dispenser system 705 (step 845), the dispenser system 705 generates random or pseudo-random data (step 850) and encrypts the generated data using the public key associated with the POS system 720 (step 855). The dispenser system 705 sends the encrypted data to the POS system 720 (step 860). The POS system 720 decrypts the encrypted data using its private key (step 865), and sends the decrypted data back to the dispenser system 705 (step 870). The dispenser system validates the received data by comparing it with its original generated data (step 875). If the received data is validated, the dispenser system 705 sends a message to the POS system 720 indicating that the normal transaction using the remote network host 735 can begin (step 880).

Figure 9:
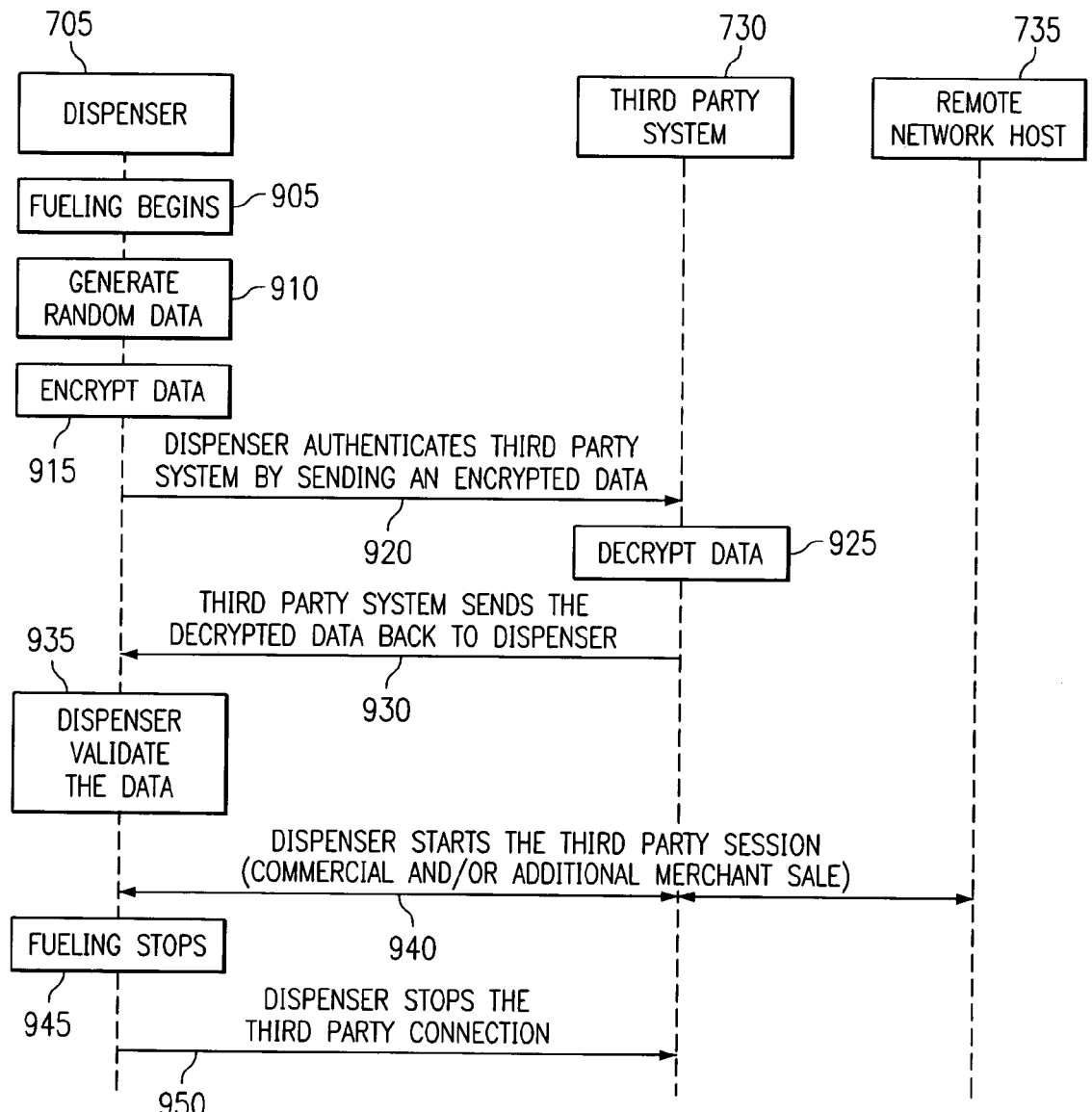
FIG. 9 illustrates a method for providing a secured third party transaction in accordance with the secured data communication system 700 of FIG. 7.

Referring now to FIG. 9, there is illustrated a method for providing a secured third party transaction in accordance with the secured data communication system 700 of FIG. 7. In step 905, a fueling operation is initiated by a customer at the dispenser system 705 which includes a third party transaction. The dispenser system 705 generates random or pseudo-random data based upon the current time, time related data, or other unique data that cannot be predicated (step 910) and encrypts the generated data using the public key associated with the third party system 730 (step 915). The dispenser system 705 sends the encrypted data to the third party system 730 for authentication (step 920). In step 925, the third party system 730 decrypts the encrypted data using its private key, and sends the decrypted data back to the dispenser system 705 (step 930).

The dispenser system 705 validates the received data by comparing it with its original generated data (step 935). If the received data is validated, the dispenser system 705 sends a message to the third party system 730 indicating that the third party session using the remote network host 735 for authentication can begin (step 940), allowing the sending of advertisement-type contents or additional merchant sales. Once the fueling operation stops (step 945), the dispenser system 705 sends a message to the third party system 730 to end the connection to the third party system 730 (step 950).

Figure 10:
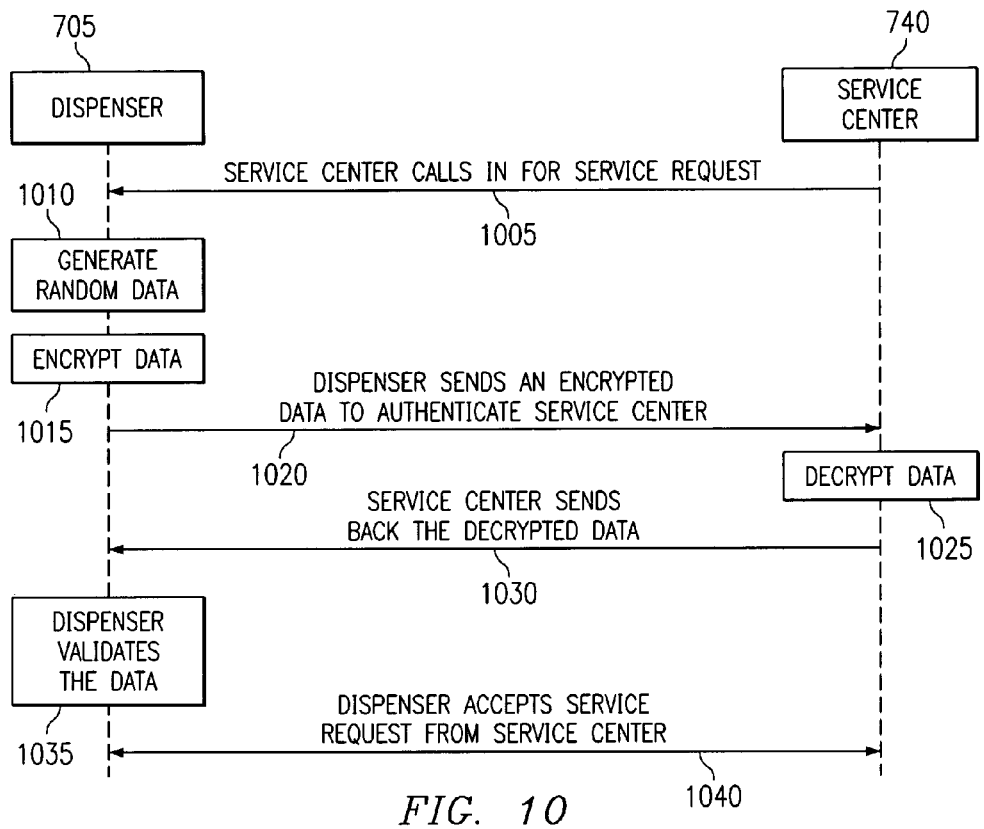
FIG. 10 illustrates a method for providing secured service in accordance with the secured data communication system 700 of FIG. 7.

Referring now to FIG. 10, there is illustrated a method for providing secured service in accordance with the secured data communication system 700 of FIG. 7. In step 1005, a local or remote service center 740 sends a service center request to the dispenser system 705. Upon receiving the service center request, the dispenser system 705 generates random or pseudo-random data based upon the current time, time related data, or other unique data that cannot be predicted (step 1010). The dispenser system 705, encrypts the generated data using a public key associated with the service center 740 (step 1015), and sends the encrypted data to the service center 740 for authentication (step 1020).

Upon receipt of the encrypted data, the service center 740 decrypts the data using its private key (step 1025), and sends the decrypted data back to the dispenser system 705 (step 1030). After receiving the decrypted data, the dispenser system 705 validates the received data by comparing it with its original generated data (step 1035). If the received data is validated, the dispenser system considers the service center 740 as a trusted system, and accepts and processes service commands from the service center 740 (step 1040).

Figure 11:
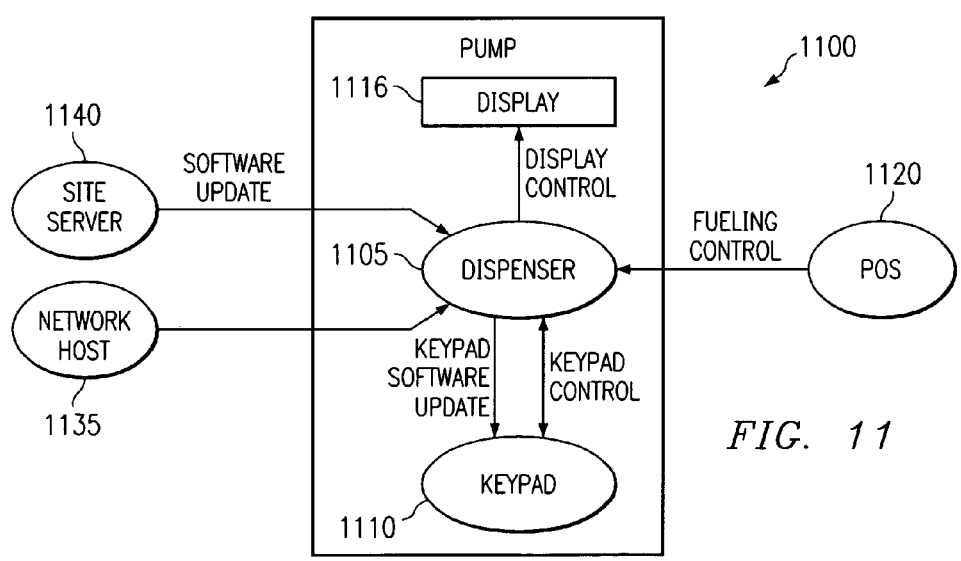
FIG. 11 illustrates an example secure fuel dispensing environment in accordance with certain embodiments of the present disclosure.

FIG. 11 illustrates an example secure fuel dispensing system or environment 1100 in accordance with certain embodiments of the present disclosure. Fuel dispensing environment 1100 includes any number of nodes that are communicably coupled with another for intranodal communications. Each node may be any computer, server, network device, or component thereof that is operable to securely communicate with at least one other node. For example, illustrated environment 1100 includes at least six nodes: fuel dispenser 1105, keypad or TRSM 1110, display or GUI 1116, POS 1120, network host 1130, and site server 1140.

At a high level, much of the secured data transfer in fueling environment 1100 (such as card data, software updates, or other fueling-related data) is encrypted with a symmetric key, which is generated at run-time based on a pre-defined algorithm that both sides agree to using their public/private keys. Based on this agreement, there is no requirement for the symmetric key to be explored or exchanged over the network. To further increase the security of environment 1100, the symmetric key is normally no longer valid after a power reset or a pre-defined time expires. Secured fueling environment 1100 doesn't normally have server and client differences— instead, each node distributes, communicates, or publishes its public key. A (public key) certificate in secured fueling environment 1100 is normally a digitally signed statement that binds the public key value to the identity of the node that generates the public/private key pair and holds the private key internally. The certificate is issued by one of the certificate authorities in a certification hierarchy. Child certificates (tier 1 CA, tier 2 CA, etc.) are normally digitally signed by a root CA, which is the certificate authority that the relevant nodes trust. In certain embodiments, the certificate includes: (1) the requester public key value; (2) the requester identity; (3) the key expiration time; (4) the issuer (certificate authority) identification; and (5) the digital signature that binds the requester public key with the certificate authority identification and the parent certificate public key if it exists.

As described in more detail above, fueling environment 1100 includes at least one dispenser node 1105. Dispenser 1105 typically includes or is communicably coupled with at least two other nodes, keypad 1110 and GUI 1116. GUI 1116 comprises a graphical user interface operable to allow the user of dispenser 1105 to interact with a native application or hardware. Generally, GUI 1116 provides the user of dispenser 1105 with an efficient and user-friendly presentation of data provided by dispenser 1105. GUI 1116 may comprise a plurality of displays having interactive fields, pull-down lists, and buttons operated by the user. And in one example, GUI 1116 presents an explore-type interface and receives commands from the user. It should be understood that the term graphical user interface may be used in the singular or in the plural to describe one or more graphical user interfaces in each of the displays of a particular graphical user interface. Further, GUI 1116 contemplates any graphical user interface, such as a generic web browser, that processes information in or associated with dispenser 1105 and efficiently presents the information to the user. For example, POS 1120 or site server 1140 can accept data from the user of dispenser 1105 via the web browser (e.g., Microsoft Internet Explorer or Netscape Navigator) and return the appropriate Hyper Text Markup Language (HTML) or eXtensible Markup Language (XML) responses.

Site server 1140 is one node in environment 1100 that provides software updates, marketing multimedia, or other data for use by dispenser 1105 or one of its coupled components, such as keypad 1110 or GUI 1116. Server 1140 typically includes memory and processor and comprises an electronic computing device operable to receive, transmit, process, and store data associated with dispenser 1105. For example, site server 1140 may be any computer or processing device such as, for example, a blade server, general-purpose personal computer (PC), Macintosh, workstation, Unix-based computer, or any other suitable device. Generally, FIG. 1 provides merely one example of computers that may be used with the disclosure. Indeed, although FIG. 1 illustrates one site server 1140 that may be used with the disclosure, site server 1140 can be implemented using computers other than servers, as well as a server pool. In other words, environment 1100 may include numerous related or unrelated site servers 1140, without departing from the scope of this disclosure. Site server 1140 may be adapted to execute any operating system including Linux, UNIX, Windows Server, z/OS or any other suitable operating system. But, the present disclosure contemplates servers other than general purpose computers as well as servers without conventional operating systems. According to one embodiment, site server 1140 may also include or be communicably coupled with a web server and/or a email server. The memory may include any memory or database module and may take the form of volatile or non-volatile memory including, without limitation, magnetic media, optical media, random access memory (RAM), read-only memory (ROM), removable media, or any other suitable local or remote memory component.

Site server 1140 also includes one or more processors. The one or more processors executes instructions and manipulates data to perform the operations of site server 1140 such as, for example, a central processing unit (CPU), a blade, an application specific integrated circuit (ASIC), or a field-programmable gate array (FPGA). The processors typically execute software such as, for example, a patch distribution module and/or a multimedia engine. As used herein, software may be written or described in any appropriate computer language including, for example, C, C++, Java, J#, Visual Basic, assembler, Perl, any suitable version of 4GL, or any combination thereof and generally includes or utilizes any appropriate combination of software, firmware, hardware, and/or other logic. Site server 1140 may also include an interface for communicating with other computer systems, such as dispenser 1105, over the network in a client-server or other distributed fuel dispensing environment. Generally, the interface comprises logic encoded in software and/or hardware in a suitable combination and operable to communicate with the network. More specifically, the interface may comprise software supporting one or more communications protocols associated with communications network or hardware operable to communicate physical signals.

In one aspect of operation of secured fueling environment 1100, a node (such as dispenser 1105, point of sale 1120, network host 1135, or site server 1140) can join the secure system by publishing its own public key, which is typically generated internally. For additional security, this public key may be digitally signed (such as a certificate) by a trusted agent (certificate authority or CA) that certain nodes agree to trust in this secured environment. In certain embodiments, the certificate authority is not required to stay in the fueling environment at run-time for public key exchange. Instead, the certificate authority should be able to distribute its public key offline and the public key certificate should be able to be obtained offline. Once two nodes are to communicate with one another, an authentication process is normally performed to ensure that the other node properly identifies itself and is appropriate to communicate with. For secured data transfer using asymmetric key encryption (public/private key pair), the sender uses the receiver's published public key to encrypt the data. This prevents transmission, exploring, or theft of the private key on the network. In order to increase the data transfer speed after authentication, a symmetric key is used for subsequent communications. The symmetric key is generated by a particular algorithm that uses asymmetric keys. This eliminates the key management and session key generation requirement normally associated with symmetric keys. This may help to prevent hackers from reversing engineer the symmetric key used in the monitored transaction. For example, when dispenser 1105 reports customer credit card information to POS 1120 for transaction authorization, site server 1140 (or a third-party) can't see it since the card data is encrypted with a symmetric key generated between POS 1120 and dispenser 1105. In another example, a software update from site server 1140 to dispenser 1105 can't be viewed by POS 1120 (or a third-party). Moreover, keypad 1110 can trust what GUI 1116 can show even if keypad 1110 doesn't directly control GUI 1116. Put another way, after public key exchange and authentication process, keypad 1110 can trust that dispenser 1105 is a trusted GUI 1116 controller. When keypad 1110 is enabled for data entry, it can send the pre-stored secure prompts to the trusted GUI 1116 controller (in dispenser 1105) knowing that GUI 1116 won't show, for example, "Please Enter Your Debit PIN" while keypad 1110 is not in the encryption mode. This example aids in preventing theft of customer PIN numbers by alternating the prompts on GUI 1116. Also, as described above, secured fueling environment 1100 may enable software updates for a security device, such as TRSM, or other components. After the authentication process, site server 1140, dispenser 1105, and TRSM can trust each other and they can exchange the encrypted TRSM software for TRSM software upgrade at the site. To further verify the message integrity and to verify if the message is indeed sent from the sender, a digital signature may also be provided at the end of the message. For example, the digital signature may be the encrypted one-way hash value of the entire message by using the receiver's public key.

FIGS. 12A-C illustrate example methods (1200, 1300, and 1400 respectively) for communicating within a secure fuel dispensing system in accordance with certain embodiments of the present disclosure. Generally, i) method 1200 describes one example technique for joining a secure fuel dispensing system that includes certain intra-nodal communications encrypted using a symmetric key; ii) method 1300 describes one example technique for authenticating or otherwise verifying a particular node in the fuel dispensing system; and iii) method 1400 describes one example technique for identifying the appropriate symmetric key for particular secure communications. It will be understood that methods 1200, 1300, and 1400 are for illustration purposes only and that the described or similar techniques may be performed at any appropriate time, including concurrently, individually, or in combination. The following descriptions will focus on the operation of fuel dispensing system 1100 in performing this method. But any fuel dispensing system, including any number of suitable nodes, may use any appropriate combination and arrangement of logical elements implementing some or all of the described functionality. Indeed, an example node in a fuel dispensing system may execute example method 1300 to perform authentication with another node, but may use a technique different from method 1400 for determining a symmetric key for encrypting certain subsequent intra-nodal communications.

Method 1200 begins at step 1202, when a first node joins fuel dispensing system 1100. For example, this first node may be a replacement component, an updated component, a new server 1140 or dispenser 1105, or any other device that might securely communicate with other nodes in environment 1100. In another example, the first node may be an existing component that is associated with an expired public key. In this case, the node may no longer accept encrypted communications from other nodes using such an expired key until it has successfully rejoined environment 1100. To securely join environment 1100, the first node identifies or generates a first public-key at step 1204 and an associated first private key at step 1206. In certain embodiments, the first node may associate the first public-key with a certificate from a trusted certificate authority at step 1208. Next, the first node publishes the first public-key (and the associated certificate) at step 1210. This publication may occur selectively, incrementally, in batch, in response to a request from one or more nodes in fuel dispensing environment 1100, or using any other appropriate technique so long as a desired second node has knowledge of the first node's public key.

Once the first node joins fueling environment 1100, it is able to receive secure communicate from other nodes. For example, at step 1212, the first node identifies a second node in the fuel dispensing system 1100 that it should communicate with. The first node receives or identifies a second public-key associated with the identified second node at step 1214. It will be understood that the first node may request the second node's public key, receive it automatically upon joining environment 1100, retrieved a locally stored copy, or use any other suitable procedure for acquiring it. Once the second node's public key is identified, the first node authenticates the second node using the second public-key and the first node's public/private key combination at step 1216. If authenticated, then, at step 1218, the first node generates a runtime symmetric key for the communication with the second node. In certain embodiments, the symmetric key may last for the communication, the transaction, up to an expiration date, or any other suitable timeframe. Once the symmetric key is generated, the first node encrypts the relevant data using the symmetric key at step 1220. This encrypted data is then communicated to the second node at step 1222 for subsequent decryption and processing. As described in more detail above, this symmetric key may allow for speedier or more efficient intranodal communications. Yet because the symmetric key is not explored over the network, an adverse party or device may not steal the key.

As shown at step 1216, once each node gets the other's public key, they are ready to authenticate each other so they can communicate or transfer any secured data or service— method 1300 provides one technique for such an authentication. In this example technique, each node first verifies if the other node has the correct private key. It generates a random number and uses the other node's public key to encrypt it. The other node then uses its own private key to decrypt it, encrypts it again with the sender's public key, and transmits the encrypted data back. The receiver then decrypts it with its own private key and checks it against the original random or pseudo-random data.

More specifically, method 1300 begins at step 1302, where the first node generates pseudo-random data, such as pseudo-random number A. The first node encrypts random number A using the second public-key associated the second node at step 1304. This encrypted random number A is then communicated to the second node at step 1306. After any suitable time, the first node receives an encrypted communication from the second node at step 1308. At step 1310, the first node decrypts this communication using the first private key associated with the first node (itself). Next, at decisional step 1312, the first node determines if the received communication is equal to the generated random number A. If they are not equal, then the first node cannot verify or otherwise authenticate the second node and processing ends. Otherwise, the first node authenticates the second node at step 1314 and processing may proceed to verification of various user ID/password combinations. Put another way, one or both (now authenticated) nodes can verify the other side's user ID and password and check it against its local stored value. As in the illustrated embodiment, the node may use a one-way hash algorithm, such as MD-5, to prevent from reverse engineering of the combination.

To this end, at step 1316, the first node determines if it should verify a user ID/password combination of the second node. For example, the first node may request verification of it's locally stored user ID/password combination associated with the second node. The first node receives an encrypted random number B at step 1318—if unsolicited, this may indicate that the second node is requesting verification prior to allowing access by the first node. The first node decrypts this random number B using the first private key at step 1320. The first node then hashes the known user ID/password combination of the second node at step 1322. Next, at step 1324, the first node adds the random number B to the hash value to determine a new value; for example, the new value (M) of f(B+one-way hash(user ID/password)), where f is the defined algorithm. This new value is encrypted using the second public-key at step 1326 and communicated to the second node at step 1328. If a verification message is received at step 1330, then the first node already includes, stores, or references an appropriate user ID/password combination for the second node. While not illustrated, if the first node does not have a suitable, authentic, or current user ID/password combination for the second node, then the first and/or second node may execute or request any appropriate processing to get the combination to the first node. For example, the second node may send a message to POS 1120 or site server 1140 indicating that the first node is lacking the combination. In another example, the second node may encrypt the user ID/password combination using the first node's public (asymmetric) key for subsequent decryption by the first node.

Next, at decisional step 1332, the first node determines if the second node requires or may use a user ID/password combination for access to the first node. As above, for example, the first node may receive a request for verification of the second node's locally stored user ID/password combination associated with the first node. In another example, the first node may automatically initiate this user ID/password verification after authenticating the second node. If the second node does need the user ID/password to access or communicate with the first node, then the first node hashes the appropriate user ID/password combination using any suitable hashing algorithm at step 1334. Next, the first node generates a random number C at step 1336. At step 1338, the first node encrypts the random number C using the second public-key associated with the second node and communicates this encrypted random number C to the second node at step 1340. At step 1342, the first node receives an encrypted new value from the second node. The first node decrypts this new value using the first private key at step 1344 and subtracts the generated number C from the new value at step 1346. If the remainder equals the hashed user ID/password combination (generated at step 1334) at step 1348, then the first node verifies that second node has an appropriate or correct user ID/password combination for accessing the first node at step 1350.

Returning to method 1200, symmetric key encryption can be used to speed up the secured data transfer (such as card data per fueling transaction) as shown in step 1218. In the secured fueling environment 1100, the symmetric key is generated by both sides at run-time based on the exchanged or published public keys using any suitable technique, such as example method 1400. Method 1400 begins at step 1402, when the first node generates pseudo-random number D. The first node encrypts the random number D using the second public-key associated with the second node at step 1404. Next, at step 1406, the first node communicates this encrypted random number D to the second node. After any suitable time, the first node receives an encrypted random number E from the second node at step 1408. The first node encrypts random number E, at step 1410, using the first private key associated with first node. For example, the two nodes (A, B), have public/private key pairs as APK/AVK and BPK/BVK, respectively. A generates a random number D and B generates a random number E locally. A sends the encrypted random number D as BPK(D) to B and B sends the encrypted random number E as APK(E). A decrypts E from APK(E) by using its private key AVK and B can obtain D similarly.

At step 1412, the first node identifies a symmetric key algorithm with the second node. For example, both the first and second nodes may agree on a key generation algorithm F, possibly with key expiration time. In an example embodiment, say example node A has pre-defined key algorithms F1, F2 and F3 and example node B has pre-defined key algorithms F3, F4, and F5. Node A can send its pre-defined key algorithm information (such as algorithm name, ID, and/or additional information) to node B and vice versa. This message exchange may use the particular receiver's public key to avoid exploring the key generation algorithm over the network. Once each node receives an algorithm that it supports, it responds back and indicates a selection to the other node. This way, an agreed algorithm can be established. In this example, the agreed algorithm is F3. In certain embodiments, if the two nodes can't find an agreed key generation algorithm, then they can't exchange data, such as card data, until an agreed algorithm is re-defined on either node or both nodes later. At step 1414, the first node generates a symmetric key using the identified symmetric key algorithm on the pseudo-random numbers D and E. In certain embodiments, the symmetric key may be used only once per credit card number, transaction, card swipe, or other communication. In other embodiments, a session key may be generated based on the symmetric key generated by using Derived Unique Key Per Transaction (DUKPT) or a Master/Session algorithm. This can avoid generating the symmetric key per transaction or per card swipe. Again returning to the example, the first and second nodes each internally generate the agreed symmetric key, such as K=F(D, E), thereby avoiding transmission over the network. The agreed key generation algorithm may use pseudo-random data (8-bytes) generated by A as a message and encrypts it with key equals to pseudo-random data (8-bytes) generated by B by applying Data Encryption Standard (DES) resulting in an 8-byte key. For example, as generally described at http://www.aci.net/kalliste/des.htm, if A generates a pseudo-random number D="596F7572206C6970" (in hex, 8 bytes) and B generates a pseudo-random number E="0E329232EA6D0D73" (in hex, 8 bytes), the symmetric key it generates is "C0999FDDE378D7ED" (in hex, 8 bytes) by encrypting D and E using the DES algorithm. In certain embodiments, the first node may associate an expiration date with the symmetric key and communicate this data to the second node as shown by decisional step 1416 and step 1418.

The preceding flowcharts and accompanying description illustrate exemplary methods 1200, 1300, and 1400. In short, fueling environment 1100 contemplates using any suitable technique for performing these and other tasks. Accordingly, many of the steps in these flowcharts may take place simultaneously and/or in different orders than as shown. Moreover, fueling environment 1100 may use methods with additional steps, fewer steps, and/or different steps, so long as the methods remain appropriate.

Although this disclosure has been described in terms of certain embodiments and generally associated methods, alterations and permutations of these embodiments and methods will be apparent to those skilled in the art. For example, both the asymmetric key (public/private key pair) and symmetric key used in the secured fueling environment may have an expiration date/time definition. The asymmetric key can distribute its key expiration data and time in the public key certificate, while the symmetric key expiration data and time are usually negotiated between the sender and receiver at run-time. Usually the symmetric key may be expired after one transaction to avoid reverse engineering. After one of the keys expire, a new key may be re-distributed (asymmetric key) or re-generated (symmetric key). Accordingly, the above description of example embodiments does not define or constrain this disclosure. Other changes, substitutions, and alterations are also possible without departing from the spirit and scope of this disclosure.

What is claimed is:

1. A first node within a fueling environment with secure communication, the first node:
   generating a first public key and a first private key associated with the first node;
   publishing the first public key within the fueling environment;
   authenticating a second node within the fueling environment using, at least in part, a second public key associated with the second node and the first public and the first private keys;
   dynamically generating a run-time symmetric key using, at least in part, the first private key and the second public key, the symmetric key comprising a localized key for the first node such that it is not communicated to other nodes; and
   communicating data associated with the fueling environment to the authenticated second node, the data encrypted using the symmetric key and operable to be decrypted by the second node using, at least in part, a second symmetric key localized at the second node.

2. The first node of claim 1, wherein the first node comprises a customer access terminal (CAT) associated with a fuel dispenser.

3. The first node of claim 1, wherein the first node comprises a point-of-sale (POS) system and the second node comprises a fuel dispenser.

4. The first node of claim 1, wherein the first node comprises a site server and the second node comprises a fuel dispenser.

5. The first node of claim 1, each of the first public key and the second public key associated with a certificate from a certificate authority.

6. The first node of claim 1, wherein authenticating the second node within the fueling environment comprises:
   generating first pseudo-random data;
   encrypting the first pseudo-random data using the second public key;
   communicating the encrypted first pseudo-random data to the second node;
   receiving an encrypted second pseudo-random data, the second pseudo-random data encrypted using the first public key;
   decrypting the encrypted second pseudo-random data using the first private key; and
   authenticating the second node by comparing the first pseudo-random data and the second pseudo-random data.

7. The first node of claim 6, the first node:
   receiving an encrypted third pseudo-random data, the third pseudo-random data encrypted using the first public key;
   decrypting the encrypted third pseudo-random data using the first private key;
   hashing a user ID/password combination associated with the second node;
   adding third pseudo-random data to the hashed combination to generate a request verification message;
   encrypting the request verification message using the second public key;
   communicating the encrypted request verification message to the second node; and
   receiving a verification message indicating that the user ID/password combination is valid.

8. The first node of claim 6, the first node:
   hashing a user ID/password combination associated with the first node;
   generating third pseudo-random data;
   encrypting the third pseudo-random data using the second public key;
   communicating the encrypted third pseudo-random data to the second node;

receiving an encrypted fourth pseudo-random data, the fourth pseudo-random data encrypted using the first public key;

decrypting the encrypted fourth pseudo-random data using the first private key;

subtracting the third pseudo-random data from the decrypted fourth pseudo-random data to determine the second node's verification request; and verifying that the second node has the valid user ID/password combination by comparing the hashed combination and the verification request.

9. The first node of claim 1, wherein dynamically generating the run-time symmetric key using, at least in part, the first private key and the second public key comprises:

identifying a symmetric key algorithm;

generating first pseudo-random data;

encrypting the first pseudo-random data using the second public key;

communicating the encrypted first pseudo-random data to the second node;

receiving an encrypted second pseudo-random data, the second pseudo-random data encrypted using the first public key;

decrypting the encrypted second pseudo-random data using the first private key;

generating a symmetric key using the identified symmetric key algorithm on the first pseudo-random data and the second pseudo-random data;

whereby communicating data associated with the fueling environment to the authenticated node comprises transmitting at least one encrypted communication between the first node and the second node, the communication encrypted using the symmetric key.

10. The first node of claim 9, wherein identifying the symmetric key algorithm comprises the first node:

communicating information associated with a plurality of symmetric key algorithms to the second node, the information comprising at least an identifier of each of the symmetric key algorithms; and receiving a selection of a particular one of the plurality of symmetric key algorithms from the second node.

11. The first node of claim 1, the first node dynamically generating a second run-time symmetric key using, at least in part, the first private key and the second public key for at least one encrypted communication between the first node and the second node after a power reset of the first node or a power reset of the second node.

12. The first node of claim 1, the symmetric key associated with an expiration date and the first node dynamically generating a second run-time symmetric key using, at least in part, the first private key and the second public key for at least one encrypted communication between the first node and the second node after expiration of the first symmetric key.

13. A computer implemented method for secure intranodal communication within a fueling environment comprising the following method steps using one or more processors:

generating a first public key associated with a first node;

publishing the first public key within the fueling environment;

authenticating a second node within the fueling environment using, at least in part, a second public key associated with the second node and the first public and the first private keys;

dynamically generating a run-time symmetric key using, at least in part, the first private key and the second public key, the symmetric key comprising a localized key for the first node such that it is not communicated to other nodes; and communicating data associated with the fueling environment to the authenticated second node, the data encrypted using the symmetric key and operable to be decrypted by the second node using, at least in part, a second symmetric key localized at the second node.

14. The method of claim 13, wherein authenticating the second node within the fueling environment comprises:

generating first pseudo-random data;

encrypting the first pseudo-random data using the second public key;

communicating the encrypted first pseudo-random data to the second node;

receiving an encrypted second pseudo-random data, the second pseudo-random data encrypted using the first public key;

decrypting the encrypted second pseudo-random data using the first private key; and authenticating the second node by comparing the first pseudo-random data and the second pseudo-random data.

15. The method of claim 14, further comprising:

receiving an encrypted third pseudo-random data, the third pseudo-random data encrypted using the first public key;

decrypting the encrypted third pseudo-random data using the first private key;

hashing a user ID/password combination associated with the second node;

adding third pseudo-random data to the hashed combination to generate a request verification message;

encrypting the request verification message using the second public key;

communicating the encrypted request verification message to the second node; and receiving a verification message indicating that the user ID/password combination is valid.

16. The method of claim 14, further comprising:

hashing a user ID/password combination associated with the first node;

generating third pseudo-random data;

encrypting the third pseudo-random data using the second public key;

communicating the encrypted third pseudo-random data to the second node;

receiving an encrypted fourth pseudo-random data, the fourth pseudo-random data encrypted using the first public key;

decrypting the encrypted fourth pseudo-random data using the first private key;

subtracting the third pseudo-random data from the decrypted fourth pseudo-random data to determine the second node's verification request; and verifying that the second node has the valid user ID/password combination by comparing the hashed combination and the verification request.

17. The method of claim 13, wherein dynamically generating the run-time symmetric key using, at least in part, the first private key and the second public key comprises:

identifying a symmetric key algorithm;

generating first pseudo-random data;

encrypting the first pseudo-random data using the second public key;

communicating the encrypted first pseudo-random data to the second node;

receiving an encrypted second pseudo-random data, the
second pseudo-random data encrypted using the first
public key;
decrypting the encrypted second pseudo-random data
using the first private key;
generating a symmetric key using the identified symmetric
key algorithm on the first pseudo-random data and the
second pseudo-random data;
whereby communicating data associated with the fueling
environment to the authenticated node comprises:
transmitting at least one encrypted communication to
the second node, the communication encrypted using
the symmetric key; and
expiring the symmetric key after communicating the one
or more encrypted communications.

18. The method of claim 17, wherein identifying the symmetric key algorithm comprises:
communicating information associated with a plurality of
symmetric key algorithms to the second node, the information comprising at least an identifier of each of the
symmetric key algorithms; and
receiving a selection of a particular one of the plurality of
symmetric key algorithms from the second node.

19. The method of claim 13, further comprising dynamically generating a second run-time symmetric key using, at least in part, the first private key and the second public key for at least one encrypted communication between the first node and the second node after a power reset of the first node or a power reset of the second node.

20. The method of claim 13, the symmetric key associated with an expiration date and the method further comprising dynamically generating a second run-time symmetric key using, at least in part, the first private key and the second public key for at least one encrypted communication between the first node and the second node after expiration of the first symmetric key.

21. A fueling environment with secure communication comprising:
a fuel dispenser; and
at least one node communicably coupled with the fuel dispenser;
wherein the fuel dispenser is operable to:
generate a first public key and a first private key associated with the fuel dispenser;
publish the first public key within the fueling environment;
authenticate a particular one of the nodes using, at least
in part, a second public key associated with the particular node and the first public and the first private
keys;
dynamically generate a run-time symmetric key using,
at least in part, the first private key and the second
public key, the symmetric key comprising a localized
key for the first node such that it is not communicated
to other nodes; and
communicate data associated with the fueling environment to the authenticated second node, the data
encrypted using the symmetric key and operable to be
decrypted by the second node using, at least in part, a
second symmetric key localized at the second node.

22. The fueling environment of claim 21, wherein the fuel dispenser authenticating the particular node within the fueling environment comprises the fuel dispenser:
generating first pseudo-random data;
encrypting the first pseudo-random data using the second
public key;
communicating the encrypted first pseudo-random data to
the node;
receiving an encrypted second pseudo-random data, the
second pseudo-random data encrypted using the first
public key;
decrypting the encrypted second pseudo-random data
using the first private key; and
authenticating the node by comparing the first pseudo-random data and the second pseudo-random data.

23. The fueling environment of claim 22, the fuel dispenser further operable to:
receive an encrypted third pseudo-random data, the third
pseudo-random data encrypted using the first public
key;
decrypt the encrypted third pseudo-random data using the
first private key;
hash a user ID/password combination associated with the
particular node;
add third pseudo-random data to the hashed combination to
generate a request verification message;
encrypt the request verification message using the second
public key;
communicate the encrypted request verification message
to the node; and
receive a verification message indicating that the user
ID/password combination is valid.

24. The fueling environment of claim 22, the fuel dispenser further operable to:
hash a user ID/password combination associated with the
fuel dispenser;
generate third pseudo-random data;
encrypt the third pseudo-random data using the second
public key;
communicate the encrypted third pseudo-random data to
the particular node;
receive an encrypted fourth pseudo-random data, the
fourth pseudo-random data encrypted using the first
public key;
decrypt the encrypted fourth pseudo-random data using the
first private key;
subtract the third pseudo-random data from the decrypted
fourth pseudo-random data to determine the node's verification request; and
verify that the node has the valid user ID/password combination by comparing the hashed combination and the
verification request.

25. The fueling environment of claim 21, wherein the fuel dispenser dynamically generating the run-time symmetric key using, at least in part, the first private key and the second public key comprises the fuel dispenser:
identifying a symmetric key algorithm;
generating first pseudo-random data;
encrypting the first pseudo-random data using the second
public key;
communicating the encrypted first pseudo-random data to
the particular node;
receiving an encrypted second pseudo-random data, the
second pseudo-random data encrypted using the first
public key;
decrypting the encrypted second pseudo-random data
using the first private key;
generating a symmetric key using the identified symmetric
key algorithm on the first pseudo-random data and the
second pseudo-random data; and
whereby communicating data associated with the fueling
environment to the authenticated node comprises transmitting at least one encrypted communication between the fuel dispenser and the node, the communication encrypted using the symmetric key.

26. The fueling environment of claim 25, wherein the fuel dispenser identifying the symmetric key algorithm comprises the fuel dispenser:

communicating information associated with a plurality of symmetric key algorithms to the particular node, the information comprising at least an identifier of each of the symmetric key algorithms; and receiving a selection of a particular one of the plurality of symmetric key algorithms from the node.

27. The fueling environment of claim 21, the fuel dispenser dynamically generating a second run-time symmetric key using, at least in part, the first private key and the second public key for at least one encrypted communication between the fuel dispenser and the particular node after a power reset of the fuel dispenser or a power reset of the node.

28. The fueling environment of claim 21, the symmetric key associated with an expiration date and the fuel dispenser dynamically generating a second run-time symmetric key using, at least in part, the first private key and the second public key for at least one encrypted communication between the fuel dispenser and the particular node after expiration of the first symmetric key.

* * * * *

UNITED STATES PATENT AND TRADEMARK OFFICE
CERTIFICATE OF CORRECTION

PATENT NO. : 7,636,840 B2  Page 1 of 1
APPLICATION NO. : 11/074468
DATED : December 22, 2009
INVENTOR(S) : Weiming Tang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1087 days.

Signed and Sealed this

Ninth Day of November, 2010

David J. Kappos
*Director of the United States Patent and Trademark Office*